US012692119B2

(12) United States Patent
Colston et al.

(10) Patent No.: US 12,692,119 B2
(45) Date of Patent: Jul. 28, 2026

(54) APPARATUS AND METHOD FOR MEDIA MANIPULATION

(71) Applicant: NCR Atleos Corporation, Atlanta, GA (US)

(72) Inventors: Scott Colston, Dundee (GB); Jamie Luke Garrett, Scotland (GB)

( * ) Notice: Subject to any disclaimer, the term of this patent is extended or adjusted under 35 U.S.C. 154(b) by 113 days.

(21) Appl. No.: 18/619,027

(22) Filed: Mar. 27, 2024

(65) Prior Publication Data

US 2025/0304398 A1 Oct. 2, 2025

(51) Int. Cl.
*B65H 29/70* (2006.01)
*G07D 11/13* (2019.01)

(52) U.S. Cl.
CPC ............. *B65H 29/70* (2013.01); *G07D 11/13* (2019.01); *B65H 2301/5121* (2013.01); *B65H 2301/5122* (2013.01); *B65H 2404/693* (2013.01); *B65H 2701/1912* (2013.01); *G07D 2211/00* (2013.01)

(58) Field of Classification Search
CPC ........ B65H 29/70; B65H 29/22; B65H 29/40; B65H 31/26; B65H 2701/1912; B65H 2301/5122; B65H 2301/5121; B65H 2404/693; G07D 11/12; G07D 11/125; G07D 11/13; G07D 11/165; G07D 11/16; G07D 11/175
See application file for complete search history.

(56) References Cited

U.S. PATENT DOCUMENTS

| | | | | |
|---|---|---|---|---|
| 6,698,752 B1 * | 3/2004 | Kakuta | .................. | B65H 29/70 271/209 |
| 2014/0029998 A1 | 1/2014 | Takemoto | | |
| 2015/0042040 A1 | 2/2015 | Ishikawa | | |
| 2015/0091235 A1 * | 4/2015 | Noso | ...................... | B65H 29/52 271/3.2 |
| 2018/0244483 A1 | 8/2018 | Oe | | |

FOREIGN PATENT DOCUMENTS

| | | | | |
|---|---|---|---|---|
| JP | 2010047395 A | * 3/2010 | | |
| JP | 2011180732 | 9/2011 | | |
| JP | 2013239075 A | * 11/2013 | | |
| JP | 2014125323 A | * 7/2014 | ............... | B65H 7/04 |

OTHER PUBLICATIONS

Extended European Search Report for corresponding European patent application No. EP 24204675.3, dated Apr. 16, 2025.

* cited by examiner

*Primary Examiner* — Luis A Gonzalez
(74) *Attorney, Agent, or Firm* — Notaro, Michalos & Zaccaria P.C.; John S Economou

(57) ABSTRACT

In a method and apparatus for storing media items at a storage zone, the apparatus has a storage zone for storing media items, a port region proximate to the storage zone for receiving at least one media item, and at least one media item deformer for deforming each media item that is transported along a transport pathway portion.

20 Claims, 16 Drawing Sheets

APPARATUS AND METHOD FOR MEDIA MANIPULATION

FIELD OF THE INVENTION

This invention relates to locating one or more media items in a storage zone. In particular, but not exclusively the invention relates to temporary manipulation of a shape or dimension of a media item as the media item is located in the storage zone such that the media item does not collide with a guide wall.

BACKGROUND

It is known that from time to time, media items (e.g., banknotes, cheques, and the like) need to be transported from one location to another. Media items are thin, flexible objects that usually require guidance along at least a majority of their surfaces as they are transported along a transport pathway inside a device. One category of devices that can often transport media items is a Self Service Terminal (SST).

SSTs are used in a range of industries including retail and banking. For example, Point of Sale Terminals such as check out terminals are often used in a retail environment where they may be operated by a sales clerk or a customer to facilitate transactions. Another type of SST is an Automated Teller Machine (ATM). Conventionally, an ATM is used within the field of Banking to provide a range of services to a customer where a number of different types of media item may be deposited into or withdrawn from the machine. For example, a customer may wish to withdraw banknotes, that will be dispensed from a safe inside the ATM. Instead of bank notes a media item may be a cheque that is being deposited or other token or the like.

The physical transfer of media items through an ATM to facilitate such functions is provided by the so-called media handling system. The media handling system is a physical system of belts and other mechanical devices that is used to physically transfer media items to and from various locations within the ATM depending on what is required. Often, media is transported to or from a cassette—for example a cash cassette—which can store media items such as banknotes and cheques. Some cassettes only have the capability to receive deposited media items, such as the NCR Atleos® Corporation Scalable Deposit Module (SDM). Other cassettes only have the capability to dispense media items, such as the NCR Atleos® Corporation S2 Media Dispense Module. Still further cassettes have the capability to both receive deposits and dispense media items. This can be used for cash recycling. It will be appreciated that similar media cassettes may be used in any type of SST.

The media handling system of an ATM and the ATM itself may conceptually be broken down into several key subsystems. A lower module of an ATM for example contains the storage locations for media items and includes a safe housing formed from strong safe walls. Storage locations might be provided by multiple storage boxes of banknotes and cheques and these are held in the safe housing. The safe housing includes a safe door that allows an operator to access the safe for replenishment or removal purposes. The safe housing around the lower module of an ATM includes one or more apertures (often just one) through which media items can be deposited into or withdrawn from the lower module. These apertures are often located at an upper surface of the safe housing and may be formed as slits. Each module within an ATM has a respective media handling subsystem that moves items of media to and from specified locations.

An upper module of an ATM provides many remaining functions of the ATM, such as currency recognition, the stacking of media items, and an entrance/exit orifice for the purpose of dispensing and/or receiving media from the customer. A transfer module is an interface region between the upper and lower modules. The transfer module conventionally includes a mechanism at each aperture that provides access through the safe housing. This is a fixed position mechanism that provides an interface for bi-directional or uni-directional media item transferal between the lower module and the upper module of the ATM. Both the upper and lower modules of the ATM include removable modules, such as the aforementioned cassettes, mounted on cradles and racks and these may be slid in and out of the ATM by human operators for maintenance or inspection or replenishment or note removal. The media item transfer mechanisms associated with the transfer module remains fixed in position secured at least in part to the rigid safe housing or frame of the ATM.

Common items that the media handling system of an ATM transports include banknotes, cheques and other thin and flexible paper-like items. These media items are generally rectangular in shape with two spaced apart long edges and two shorter edges. The media items each require physical support throughout their length during transport, or they are liable to deform with unintended consequences such as deviation from a transport pathway. The transport pathway may be considered to be a route that it is intended for an item (e.g., a media item) to take. In an SST, the transport pathway is usually provided by a series of rollers, wheels, transport belts, and the like. It is known that such devices can move media items around the SST as required. Deviation from the transport pathway can cause problems.

The media items such as cash notes may be crumpled or folded when presented by a user at the SST or may become crumpled or folded during the deposit process. This means that when stored, either for collection from an authorised security operative or for re-distribution to another user during a later transaction at the SST, the items of media are kept in an imperfect state. Crumples or creases can also impact on a potential quantity of items that can be stored in any given receptacle. Crumpled or creased media items may have a greater effective thickness than usual resulted in a lower than expected packing efficiency in a storage module. The cash notes may also become trapped or clogged within the self-service terminal. This may cause a malfunction in the self-service terminal and prevent further cash notes being deposited or prevent cash notes being dispensed. This may increase downtime of the SST, potentially costing business and requiring unnecessary extra maintenance. Offset media items may also impact the performance of sensors measuring the capacity of the storage module, or have an increased likelihood of escaping from the transport pathway.

SUMMARY

It is the aim of the present invention to at least partly mitigate one or more of the above-referenced problems.

It is an aim of certain embodiments of the present invention to provide an improved media deposit apparatus which overcomes at least some of these problems.

It is an aim of certain embodiments of the present invention to provide apparatus that is less likely to jam than conventional equipment.

It is an aim of certain embodiments of the present invention to provide apparatus for increasing the storage density of media items.

It is an aim of certain embodiments of the present invention to provide apparatus for reducing downtime of a Self Service Terminal (SST) capable of dispensing or accepting media items such as banknotes.

It is an aim of certain embodiments of the present invention to provide a method for reducing the effects of skewed and/or offset media items that are provided in a media transport system.

It is an aim of certain embodiments of the present invention to provide apparatus that facilitates increased rate of receiving deposited media items compared to conventional solutions.

According to a first aspect of the present invention there is provided apparatus for storing media items at a storage zone, comprising:

a storage zone for storing media items;

a port region proximate to the storage zone for receiving at least one media item; and at least one media item deformer for deforming each media item that is transported along a transport pathway portion.

Aptly the apparatus further comprises:

the media item deformer is configured to reduce a lateral extent of the media item as the media item moves to a desired location in the storage zone.

Aptly the apparatus further comprises:

the media item deformer is configured to move at least one short edge of the media item in a lateral direction.

Aptly the apparatus further comprises:

the media item deformer is configured to adjust the shape of the media item into an at least partially curved shape.

Aptly the apparatus further comprises:

the media item deformer is configured to adjust the shape of the media item into an at least partially corrugated shape.

Aptly the apparatus further comprises:

the media item deformer comprises at least one support surface for engagement with the media item thereby deforming the shape of the media item.

Aptly the apparatus further comprises:

a media item deformer comprises an undulating support surface and/or one or more upwardly extending ribs.

Aptly the apparatus further comprises:

the apparatus comprises a transport pathway portion from the port region into the storage zone.

Aptly the apparatus further comprises:

the transport pathway portion comprises an interface region through which the media item passes from the transport pathway portion into the storage zone.

Aptly the apparatus further comprises:

The media item deformer is located adjacent to the interface region.

Aptly the apparatus further comprises:

at least one set of mover elements to at least partially move the media item along the transport pathway portion.

Aptly the apparatus further comprises:

the media item deformer is located adjacent to a final set of mover elements before a media item moves to a desired location of the storage zone.

Aptly the apparatus further comprises:

the media item deformer is movable between a retracted configuration and a protruding configuration.

Aptly the apparatus further comprises:

in the protruding configuration the media item deformer extends towards the transport pathway portion and/or in the retracted configuration the media item deformer extends away from the transport pathway portion.

Aptly the apparatus further comprises:

the storage zone comprises a chamber region in a storage receptacle that is a currency cassette and each media item comprises a currency note of a specified denomination whereby currency notes of a common denomination are stacked in the currency cassette.

According to a second aspect of the present invention there is provided a method for receiving media items at a desired location in a storage zone, comprising:

providing at least one media item one-by-one at a port region proximate to a storage zone; and as each media item is transported from the port region to a desired location in the storage zone, deforming the media item via at least one media item deformer thereby reducing at least a lateral extent of the media item as the media item moves to the desired location.

Aptly, the method further comprises:

deforming the media item by temporarily inducing a curved shape in a cross-section of the media item thereby drawing spaced apart edges of the media item together.

Aptly, the method further comprises:

deforming the media item by transporting the media item over at least one undulating support surface.

Aptly, the method further comprises:

deforming the media item by transporting the media item between opposed sets of offset roller elements.

Aptly, the method further comprises:

reducing the lateral extent of the media item by inducing at least one curve in a cross-section of a long edge of the media item thereby locating at least one short edge of the media item nearer to a centre of the media item than when the media item is in an unloaded state.

According to a third aspect of the present invention, there is provided a system, comprising at least one processing device having at least one processor configured to execute instructions from a non-transitory computer-readable storage medium; the instructions when executed by the at least one processor from the non-transitory computer-readable storage medium cause the at least processor to perform a method of the invention.

According to a fourth aspect of the present invention there is provided a terminal, the apparatus comprising:

a user opening for receiving deposited media items, a storage zone for storing the media item, and a media item deformer to move at least one edge of the media item towards a desired location of the storage zone.

By adjusting the shape of the media item, the edge of the media item is urged towards the desired location of the storage zone. In this manner the media item is prevented from becoming partially stacked or stranded on top of a side wall of the storage zone. By adjusting the shape of the media item, this ensures that deposited media items are directed towards the desired location of the storage zone. In this manner the apparatus prevents the media item becoming crumpled or folded on top of the side wall of the storage zone and ensures that the media items are stored flat in the storage zone. The apparatus also prevents the media item becoming trapped or clogged on top of the side wall of the storage zone to allow further media items to be deposited or media items to be dispensed.

By adjusting the shape of the media item, the media item enters the storage zone between the side walls of the storage zone. In this manner the apparatus avoiding any impact or clash between the media item and the side walls of the storage zone. The apparatus also avoids any jamming of the media item within the storage zone.

By adjusting the shape of the media item, this drives the media item into the storage zone in a neat consistent format. The media item is therefore lined up in a neat stack in the storage zone. In this manner the apparatus maintains the media items aligned parallel to the transport axis of the storage zone and located towards a centre line of the desired location, and prevents the media item from moving laterally to one side of the storage zone or turning at a skew angle non-parallel to the transport axis of the stacking area. This arrangement thus results in optimum operation of the apparatus.

The media item deformer may be configured to move a side edge of the media item towards the desired location of the storage zone. In this manner the media item is prevented from becoming partially stacked or stranded on top of the side wall of the storage zone. The media item deformer may be configured to move the edge of the media item in a lateral direction. In this manner the apparatus maintains the media item located towards the centre line of the desired location. The media item deformer may be configured to move the edge of the media item by at least 6 mm. The media item deformer may be configured to move the edge of the media item by at least 8 mm.

The media item deformer may be configured to adjust the shape of the media item into an at least partially curved shape. In this manner the media item is prevented from becoming partially stacked or stranded on top of the side wall of the storage zone. An axis of curvature of the curved media item may be substantially orthogonal to the lateral direction. In this manner deposited media items are directed towards the desired location of the storage zone. The media item deformer may be configured to adjust the shape of the media item into an at least partially corrugated shape.

The media item deformer may comprise at least one contact surface for engagement with the media item to adjust the shape of the media item. The media item deformer may comprise a wave contoured contact surface for engagement with the media item to adjust the shape of the media item. The media item deformer may comprise two or more upwardly extending ribs for engagement with the media item to adjust the shape of the media item. The rib may extend upwardly in a vertical axis substantially orthogonal to the lateral axis (direction). The rib may extend upwardly by at least 5 mm.

The media item deformer may comprise a first contact surface for engagement with a first surface of the media item and a second contact surface for engagement with a second surface of the media item to adjust the shape of the media item. The media item will therefore be squeezed between the first contact surface and the second contact surface. The media item deformer may comprise two or more downwardly extending ribs for engagement with the second surface of the media to adjust the shape of the media item. The rib may extend downwardly by at least 5 mm.

The media item deformer may be of a composite polymeric material. The media item deformer may be of glass fibre reinforced polycarbonate.

The apparatus may comprise a transport pathway from the user opening to the storage zone. The transport pathway may comprise an interface region through which the media item passes from the transport pathway into the storage zone. The media item deformer may be located adjacent to the interface region. The media item is then free to return to a normal flat shape after the media item exits the transport pathway. The transport pathway portion may define a media item trajectory through which the media item passes from the transport pathway portion into the storage zone.

The apparatus may comprise at least one set of mover elements to at least partially move the media item along the transport pathway portion. The media item deformer may be located adjacent to a final set of mover elements before the storage zone. The final set of mover elements may be located adjacent to the interface region. The media item is then free to return to a normal flat shape after the media item exits the transport pathway portion.

The apparatus may comprise a plurality of sets of mover elements located spaced apart along the transport pathway in a transport direction. The mover element may be configured to move the media item along the transport pathway portion by frictional engagement with the media item. The mover element may comprise a roller for rolling engagement with the media item. The mover element may comprise a pair of pinch point wheels. The pair of pinch point wheels may comprise a first wheel and a second wheel, the first wheel being rotatable by driven rotation of a first shaft. The first shaft may be spring loaded. The first wheel may be of a rubber material. The second wheel may be freely rotatable on a second shaft. The second shaft may be spring loaded. The second wheel may be of at least one of a rubber material, a plastic material, or a metal.

The media item deformer may be movable between a retracted configuration and a protruding configuration. The protruding configuration is suitable for when media items are being deposited into the storage zone. The retracted configuration is suitable for when media items are being dispensed from the storage zone. The media item deformer may be rotatable between the retracted configuration and the protruding configuration. In the protruding configuration the media item deformer may extend towards the transport pathway portion. In the protruding configuration the media item deformer may be configured to move at least one edge of the media item towards the desired location. In the retracted configuration the media item deformer may extend away from the transport pathway portion. The apparatus may comprise an actuator to move the media item deformer. The actuator may comprise a rotatory solenoid actuator. Alternatively, the apparatus may comprise a biasing element that may passively move the media item deformer.

The apparatus may comprise a guide member for urging the media items towards the desired location of the storage zone. By urging the media items towards the desired location of the storage zone, the media item is prevented from becoming partially stacked or stranded on top of the side wall of the storage zone. The guide member may be configured to urge the media item away from a side region of the storage zone. In this manner the apparatus maintains the media located towards the centre line of the desired location. The guide member may comprise a side wall of the storage zone. The guide member may have a smooth surface finish. In this manner the media item is prevented from adhering or sticking to the guide member to urge the media item towards the desired location. The guide member may be of an injection moulded plastic material.

The apparatus may comprise at least one urging member to urge the media item into a desired location in the storage zone. In this manner the apparatus prevents the media item becoming crumpled or folded on top of the side wall of the storage zone and ensures that the media items are stored flat in the storage zone. This prevents the media items becoming partially stacked or stranded on top of the side wall of the storage zone. The urging member may be configured to urge the media item in a transport direction. The urging member drives the media item into the storage zone in a neat consistent format. The urging member lines up the media items in a neat stack in the storage zone. In this manner the apparatus maintains the media item aligned parallel to the transport axis of the storage zone and located towards a centre line of the desired location, and prevents the media item from moving laterally to one side of the storage zone or turning at a skew angle non-parallel to the transport axis of the storage zone. This arrangement thus results in optimum operation of the apparatus. The urging member may be rotatable about an axis of rotation substantially parallel to a lateral direction. The urging member may be rotatable by driven rotation of a rear shaft.

The urging member may be configured to push the media item into the desired location in the storage zone. The urging member may be configured to push a trailing edge of the media item into the desired location in the storage zone. The urging member may be configured to flatten the media item in the desired location in the storage zone. Because the urging member flicks the trailing edge of the media item, this flicking action pushes the trailing edge of the media item down to flatten the media item before the next media item arrives into the storage zone. The urging member may be configured to draw the media item rearwardly in the storage zone into the desired location. The urging member may be configured to draw the media item rearwardly in a transport axis. After the media item has settled in the storage zone, the flicking action pulls the media item back slightly. This pulling back action aligns the media item in the storage zone and removes any skew.

The urging member may be configured to exert a discontinuous urging action on the media items. The urging member may comprise one or more outwardly extending arm elements to engage the media items. The urging member may comprise a plurality of arm elements, the angle defined between a first arm element and a final arm element being less than 160 degrees. The angle defined between the first arm element and the final arm element may be less than 150 degrees. The urging member may comprise a plurality of arm elements, the angle defined between an arm element and an adjacent arm element being less than 50 degrees. The angle defined between the arm element and the adjacent arm element may be less than 40 degrees. The arm element may be of a rubber material. The arm element may extend outwardly by at least 10 mm.

The urging member may comprise a flicker wheel. The flicker wheel flattens the media items in the stacking area. The flicker wheel prevents the media items becoming crumpled or folded and ensures that the media items are stored flat in the stacking area. The flicker wheel interacts with the media item to push the media item towards a desired location of the storage zone and to flatten the media item down in the storage zone.

The urging member may be movable between a stowed configuration and a deployed configuration. In the stowed configuration the arm element may extend away from the storage zone. In this manner all of the arm elements may be located away from the storage zone and away from the media item. In the stowed configuration the urging member does not engage the media item and the urging member does not exert an urging action on the media item. The stowed configuration is suitable for use during subsequent dispensing of the media item. In the deployed configuration the urging member engages the media item and the urging member exerts the urging action on the media item. The deployed configuration is suitable for use during depositing of the media item.

All of the arm elements may extend from one side of the urging member. This arrangement enables all of the arm elements to be stowed out of the away during subsequent dispensing of the media item.

The apparatus may comprise a plurality of urging members located across the storage zone. The urging members may be spaced apart across a lateral direction of the storage zone. In this manner the apparatus maintains the media item aligned parallel to the transport axis of the storage zone and located towards a centre line of the desired location, and prevents the media item from moving laterally to one side of the storage zone or turning at a skew angle non-parallel to the transport axis of the storage zone.

The storage zone may be configured to store the media items in a stack. The storage zone may comprise a base element for supporting the stored media items, the base element may be movable based on the quantity of media items stored in the storage zone. By moving the base element, the volume of the storage zone may be increased to accommodate more media items. The apparatus may comprise a sensor to determine the quantity of media items stored in the storage zone. The sensor may comprise a light sensor.

The apparatus may comprise a media recycle apparatus. The apparatus may comprise a controller to move the media item from the storage zone to the user opening to dispense the media item.

The media item may comprise at least one of a cash note, a check, or a casino voucher.

The apparatus may comprise at least one of a self-service terminal, or an automated teller machine.

According to a fifth aspect of the present invention there is provided a method for receiving deposited media items, the method comprising the steps of:

receiving deposited media items at a user opening, adjusting a shape of the media item to move at least one edge of the media item towards a desired location of the storage zone, and storing the media items at the storage zone.

By adjusting the shape of the media item, the edge of the media item is urged towards the desired location of the storage zone. In this manner the media item is prevented from becoming partially stacked or stranded on top of a side wall of the storage zone. By adjusting the shape of the media item, this ensures that deposited media items are directed towards the desired location. In this manner the method prevents the media item becoming crumpled or folded on top of the side wall of the storage zone and ensures that the media items are stored flat in the storage zone. The method also prevents the media item becoming trapped or clogged on top of the side wall of the storage zone to allow further media items to be deposited or media items to be dispensed.

By adjusting the shape of the media items, the media item enters the storage zone between the side walls of the storage zone. In this manner the method avoiding any impact or clash between the media item and the side walls of the storage zone. The method also avoids any jamming of the media item within the storage zone.

By adjusting the shape of the media item, this drives the media item into the storage zone in a neat consistent format. The media item is therefore lined up in a neat stack in the storage zone. In this manner the method maintains the media item aligned parallel to the transport axis of the storage zone and located towards a centre line of the desired location, and prevents the media item from moving laterally to one side of the storage zone or turning at a skew angle non-parallel to the transport axis of the storage zone. This arrangement thus results in optimum operation of the apparatus.

The method may comprise the step of providing a processor configured to perform the steps of the method of the invention.

According to a sixth aspect of the present invention there is provided a computer program product stored on a non-transitory computer readable storage medium, the computer program product comprising instructions capable of causing a computer system to perform a method of the invention when the computer program product is executed on the computer system.

According to a seventh aspect of the present invention there is provided a self-service terminal (SST), comprising at least one storage zone for storing at least one media item.

Optionally the SST is an automated teller machine (ATM).

Optionally each storage zone is a respective chamber region in a currency cassette where media items comprising currency notes are stackable.

Optionally the storage zone is a temporary holding zone for receiving items of media subsequent to presentation of a stack or bunch of media items, via a user, at the SST.

Optionally the storage zone is a temporary holding zone for receiving items of media prior to presentation of a stack of media items to a user of the SST.

Optionally each SST comprises a port region, proximate to the storage zone, provided to allow media items to be deposited in and/or withdrawn from the storage zone via the port region during a respective deposit or withdrawal operation at the SST.

Optionally the ATM comprises a plurality of currency cassettes each providing a respective storage zone and associated port region.

Optionally the ATM comprises at least one storage zone comprising a chamber region of a respective currency cassette and at least one storage zone comprising a temporary holding zone.

Optionally the ATM comprises an upper module, a lower module locatable in a safe and an intermediate transport between the upper module and the lower module.

Certain embodiments of the present invention provide increased traction grip on media items that are moved through a transport pathway, compared to conventional techniques.

Certain embodiments of the present invention provide apparatus for increasing storage density and therefore capacity for storing media items at a storage zone.

Certain embodiments of the present invention provide apparatus for reducing a skew of a media item relative to a direction of travel of the media item along a transport pathway. It will be appreciated that the skew of a media item may be an undesirable condition and that zero skew may refer to a leading edge of a media item being perpendicular to the direction of travel of the media item.

Certain embodiments of the present invention provide apparatus for reducing offset of a media item relative to a centreline of a transport pathway that the media item is travelling along. It will be appreciated that offset of a media item may be an undesirable condition and that zero offset may refer to a centreline of a leading edge of a media item being colinear to the centreline of the transport pathway.

Certain embodiments of the present invention provide a method of preventing a received media item from becoming partially stacked/misaligned in a stack and/or stranded on and/or behind a side wall.

Certain embodiments of the present invention provide a method of preventing a received media item from diverting from an intended media item trajectory.

BRIEF DESCRIPTION OF THE DRAWINGS

Embodiments of the present invention will now be described hereinafter, by way of example only, with reference to the accompanying drawings in which.

In the drawings like reference numerals refer to like parts.

DETAILED DESCRIPTION

Referring to FIGS. 1 to 10 there is illustrated a terminal 100 according to a certain embodiment of the invention.

Figure 1:
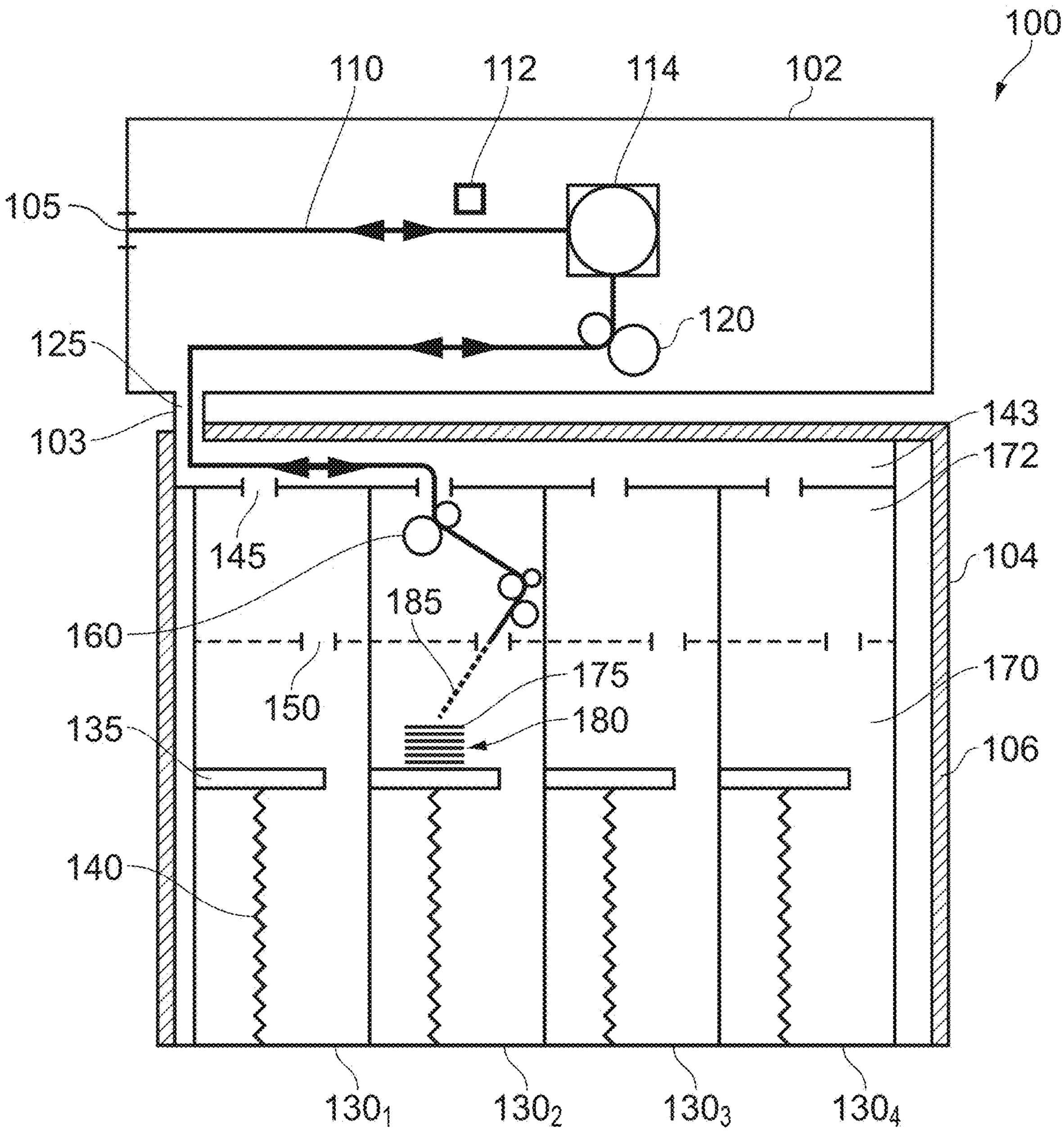
FIG. 1 is a cross-sectional side view of a terminal.

FIG. 1 illustrates a terminal 100. It will be appreciated that FIG. 1 is a diagrammatic representation of a terminal with some elements omitted. It will be appreciated that a terminal could be a self service terminal (SST) such as an automated teller machine (ATM) or point of sale retail terminal or the like. The terminal 100 may include an upper module 102, an intermediate transport 103, and a lower module 104. The terminal 100 may include a user opening 105 for receiving deposited media items 175. It will be appreciated that a media item may be a cash note, a check, a casino voucher, or the like. For example in the case of a media item having a rectangular shape, such as a typical cash note, the short edge of the media item may have a length of between 60 mm and 85 mm and the long edge of the media item may have a length of between 120 mm and 174 mm.

A user may deposit a media item 175 at the user opening 105. It will be appreciated that the user may be a customer, a terminal operator or the like. The lower module may be within a safe wall 106. After a deposited media item 175 is received at user opening 105, the media item 175 may be transported along a transport pathway 110. While being transported along the transport pathway 110 through the upper module 102, media item 175 may be imaged by an imaging module 112 and may be temporarily held by an escrow module 114. It will be appreciated that other components, such as a stacking module or a verification module or the like, may also be present in the upper module 102. At least one upper module mover element 120 may move the media item 175 along the transport pathway 110 through the upper module 102. It will be appreciated that techniques for transporting media items 175 are known in the art. At some point, the media item 175 may be transported along transport pathway 110 through the intermediate transport through hole 125 of the intermediate transport 103. After being transported through the intermediate transport through hole 125, the media item 175 may be transported along transport pathway 110 into a horizontal transport region 143 of the lower module 104. It will be appreciated that the horizontal transport region 143 may include mover elements, such as rollers, wheels, belts or the like, for transporting the media item 175 along the transport pathway 110 through the horizontal transport region 143. It will be appreciated that techniques for transporting media items 175 are known in the art.

It will be appreciated that the lower module 104 may contain at least one storage receptacle 130. The storage receptacle 130 may be a cassette or the like. The storage receptacle 130 may be used, for example, for receiving deposited media items 175, dispensing stored media items 175, storing rejected media items 175, or both receiving deposited media items 175 and dispensing stored media items 175 (i.e. recycling media items 175). FIG. 1 illustrates four storage receptacles 130: a first cassette $\mathbf{130}_1$, a second cassette $\mathbf{130}_2$, a third cassette $\mathbf{130}_3$, and a fourth cassette $\mathbf{130}_4$. It will be appreciated that the terminal 100 could contain a plurality of storage receptacles 130 used for one purpose or a plurality of storage receptacles 130 used for different purposes. Each storage receptacle 130 may only store a specific type of media item 175, for example only a specific denomination of cash note. It will be appreciated that a different number of storage receptacles may be contained within lower module 104 of a terminal 100. It will be appreciated that a storage receptacle may be removed from lower module 104 by authorised personnel. Each storage receptacle 130 may contain a storage zone 170. Aptly the storage zone may be a chamber region within the storage receptacle 130.

It will be appreciated that the storage zone 170 may be present in other parts of terminal 100 and may or may not be formed within a discrete receptacle. For example other storage zones 170 may be provided where an incoming stack or outgoing stack is temporarily held. The storage receptacle may include a pusher plate 135, which is an example of a base element. The pusher plate 135 may be mounted on a pusher plate spring 140, which is an example of a biasing element. It will be appreciated that at least one spring could be used as biasing elements, or alternative biasing elements could be used.

It will be appreciated that the media item 175 may be diverted from the horizontal transport region 143 into a specific storage receptacle 130. FIG. 1 illustrates the transport pathway 110 of the media item 175 entering the second cassette $\mathbf{130}_2$. It will be appreciated that the media item 175 and its associated transport pathway 110 may enter a different storage receptacle, as determined by the terminal. Media item 175 may enter a specific storage receptacle 130 through a respective port region 145.

The media item 175 may be moved through a transport zone 172 associated with a respective storage receptacle 130 by at least one lower module mover element 160. The media item 175 may pass from the transport zone 172 into a storage zone 170 by passing through an interface region 150. The media item 175 may pass along a media item trajectory 185 after passing through the interface region 150 and entering the storage region 170. It will be appreciated that the media item trajectory 185 is an example of a trajectory of the media item 175. At least one media item 175 may be stored in storage zone 170. It will be appreciated that if more than one media item 175 is stored in storage zone 170, then the media items 175 may be stored in a stack 180 of media items 175.

It will be appreciated that while the above description of FIG. 1 discusses the deposit of a media item 175 into user opening 105 and the subsequent transport of the media item 175 along the transport pathway 110 to a storage receptacle 130, the reverse process can also occur. That is to say, a media item 175 may be withdrawn from a storage receptacle 130 and the media item 175 may travel along the transport pathway 110 to the user opening 105 where a user can remove the media item 175. It will be appreciated that in certain embodiments the storage receptacle 130 may be a recycler cassette and the recycler cassette may allow for both storage of deposited media items 175 and the withdrawal of stored media items 175. It will be appreciated that a deposit cassette may only allow for storage of deposited media items 175, while a dispenser cassette may only allow for withdrawal of stored media items 175.

Figure 2:
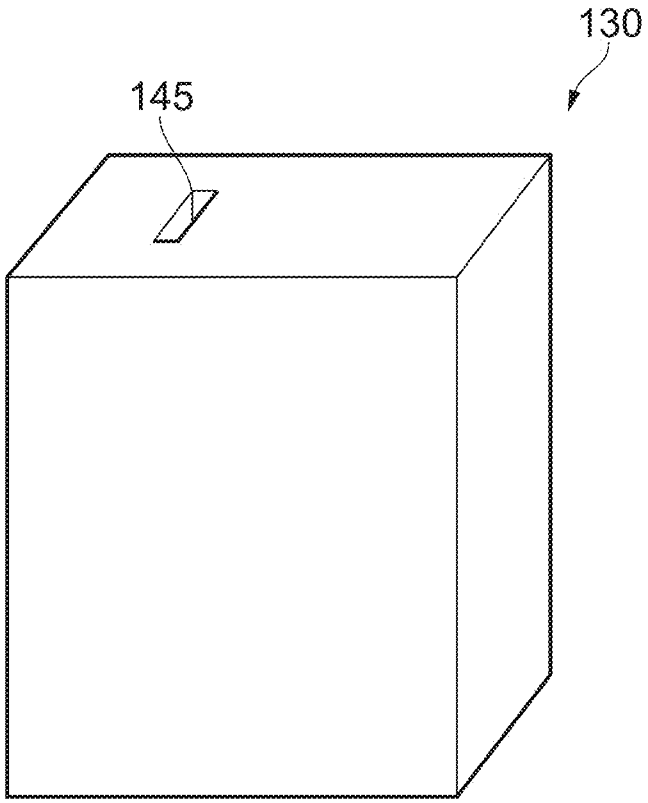
FIG. 2 is a perspective view of a storage receptacle of the terminal of FIG. 1.

FIG. 2 illustrates the storage receptacle 130. The storage receptacle may have a port region 145 to allow for the entry of media items 175 for storage and exit of stored media items 175 for withdrawal of stored media items 175. The storage receptacle 130 may be mounted within a terminal 100 or it may be removed by authorised personnel. It will be appreciated that while the storage receptacle 130 is shown in FIG. 2 as substantially cuboid, the storage receptacle 130 may be a different shape or have different dimensions. For example, the storage receptacle 130 may have a spherical or cube shape.

Figure 3:
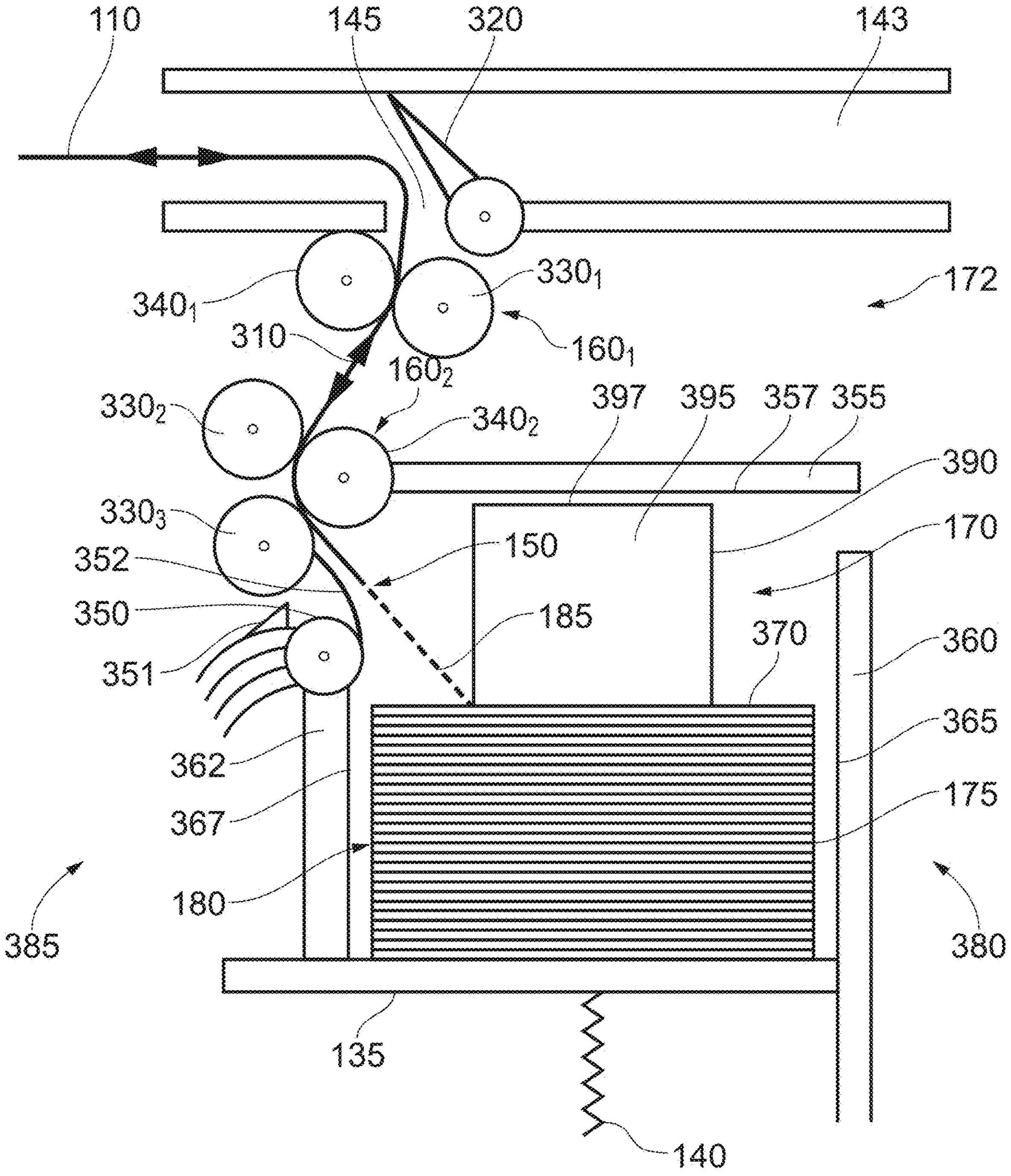
FIG. 3 is an enlarged cross-sectional side view of part of the terminal of FIG. 1.

FIG. 3 illustrates a side cross-section view of some elements of the terminal 100 including an upper region of the storage receptacle 130 (e.g., a cassette for storing banknotes). It will be appreciated that FIG. 3 is a diagrammatic representation of part of the terminal 100 where only some features are shown. The skilled person would appreciate that additional features may be added to the terminal 100. Furthermore, although features of the storage receptacle 130 are described in FIG. 3, it will be appreciated that any of the features may alternatively be provided elsewhere in an SST or any other media handling apparatus (e.g., a casino machine, banknote counting device, or the like).

Near the top of FIG. 3, media items 175 are transported along part of the transport pathway 110 by the horizontal transport region 143. The horizontal transport region 143 may include rollers, wheels, belts, or the like to move the media items 175 in a substantially horizontal direction. It will be appreciated that some known techniques for transporting media items 175 in SSTs could be used. Aptly the transport pathway 110 may be provided by guiding surfaces (e.g., channels), belts, wheels, rollers, or the like.

The transport pathway 110 of the media item 175 enters the port region 145 at the top of the storage receptacle 130 forming a transport pathway portion 310. Aptly the media item 175 is diverted towards the port region 145 by a deflecting element 320. The deflecting element 320 may be rotatable about an axis of rotation in the plane of FIG. 3. The deflecting element 320 has a protruding arm that may extend across some or all of the horizontal transport region 143. In some embodiments the deflecting element 320 may be a wheel, roller, multi-armed structure, movable plate, or the like. The deflecting element 320 may be part of the horizontal transport region 143. The transport pathway portion 310 extends from the port region 145 to the storage zone 170. Aptly the transport pathway portion 310 leads to the media item trajectory 185. That is to say at an end of the transport pathway portion 310 the media item 175 is released (no longer touches a surface) and moves mostly freely along the media item trajectory 185 until it collides with another element such as a boundary wall of the storage zone 170, the pusher plate 135 (a type of base element) or another media item 175. It will be appreciated that the transport pathway portion 310 may be bi-directional. Thus, in other embodiments, the media item 175 may move in an opposite direction through the transport pathway portion 310, i.e., from the interface region 150 to the port region 145.

As discussed previously, the interface region 150 represents a space through which items (e.g., media item 175) can pass between the storage zone 170 and the transport zone 172. Through various features that will be described herein the media items 175 are eventually moved to (or closer to) an idealised/desired location.

Below the port region 145 there are various mover elements 160 which help to move media items 175 along the transport pathway portion 310 to the interface region 150 with the storage zone 170. An upper mover element $\mathbf{160}_1$ receives media items 175 at the port region 145. The upper mover element $\mathbf{160}_1$ includes a first driving wheel $\mathbf{330}_1$ that is mounted on a first driving wheel shaft providing an axis of rotation. A torque T is applied at a rotation speed S to the central shaft by a motor (not shown) causing the first driving wheel $\mathbf{330}_1$ to rotate in the plane of FIG. 3. Aptly torque T is 0.01, 0.1, 1, 10, or 100 Nm (newton-metres) or the like. Aptly rotation speed S is 0.01, 0.1, 1, 10, or 100 m/s (metres per second) or the like. Aptly any driving wheel 330 may provide the torque T or rotation speed S as described above. Alternatively the first driving wheel shaft could be driven by a belt. At least a curved radially outer surface of the driving wheel 330 is made from rubber. Aptly any high-friction material, metal, steel, or metal alloy could be used for all or some of the driving wheel.

Near (touching or almost touching) the first driving wheel $\mathbf{330}_1$ is a first driven wheel $\mathbf{340}_1$ which is mounted on a first driven wheel shaft. Aptly a pinch point is provided between the driving wheel 330 and the driven wheel 340. Aptly the mover elements 160 provide a pinch point. Aptly a pinch point is a sufficiently small gap to grip (and optionally exert linear force on) the media item 175. Aptly a pinch point may provide a gripping pressure of 0.01, 0.1, 1, 10, 100, or 1000 N/m (newtons per metre) or the like on the media item 175. The first driven wheel $\mathbf{340}_1$ is freely rotatable about its axis of rotation provided by the shaft. The first driven wheel $\mathbf{340}_1$ may be driven (caused to rotate) by the first driving wheel $\mathbf{330}_1$. At least a curved radially outer surface of the driven wheel 340 is made from steel. Aptly rubber, any high-friction material, metal, or metal alloy could be used for all or some of the driving wheel. Also, although the driving wheel 330 is illustrated in FIG. 3 with substantially the same diameter as the driven wheel 340, in other embodiments the driving wheel 330 and the driven wheel 340 may have different diameters. It will be appreciated that in other embodiments, the driving wheel 330 may be a driven wheel and/or the driven wheel 340 may be a driving wheel. In other words in some embodiments either (or both) of the driving wheel 330 and/or the driven wheel 340 may drive or be driven.

The upper mover elements $\mathbf{160}_1$ cooperate to engender motion in the media item 175. In general the mover elements 160 help to move the media item 175 along the transport pathway portion 310. In one of the two directions represented by the transport pathway portion 310, the media item 175 is transported from the upper mover elements $\mathbf{160}_1$ to lower mover elements $\mathbf{160}_2$. The lower mover elements $\mathbf{160}_2$ consist of three wheels: a second driving wheel $\mathbf{330}_2$, a third driving wheel $\mathbf{330}_3$, and a second driven wheel $\mathbf{340}_2$. The second driving wheel $\mathbf{330}_2$ is proximate to the second driven wheel $\mathbf{340}_2$. Aptly there is a pinch point between the second driving wheel $\mathbf{330}_2$ and the second driven wheel $\mathbf{340}_2$ optionally providing a gripping pressure of 0.01, 0.1, 1, 10, 100, or 1000 N/m or the like. The second driving wheel $\mathbf{330}_2$ may provide the torque T and/or the rotational speed S. In some embodiments different driving wheels 330 may provide different respective torques T and/or respective rotational speeds S. The third driving wheel $\mathbf{330}_3$ is proximate to the second driven wheel $\mathbf{340}_2$. Aptly there is a pinch point between the second driven wheel $\mathbf{340}_2$ and the third driving wheel $\mathbf{330}_3$ optionally providing a gripping pressure of 0.01, 0.1, 1, 10, 100, or 1000 N/m or the like. In other embodiments there may be any number of mover elements 160, driving wheels 330, and/or driven wheels 340.

Below the third driving wheel $\mathbf{330}_3$ is an urging member 350. The urging member 350 illustrated in FIG. 3 is a flicker wheel, although it will be appreciated that any type of urging member may be provided instead. The urging member 350 will be described in more detail in FIG. 5. The urging member 350 is constructed of rubber. Alternatively or additionally, plastic, metal, metal alloy, ceramic, composite or the like could be used for the urging member 350. In some embodiments, there may be two or more urging members 350 forming an urging assembly. The urging member 350 is rotatable about an urging member shaft forming an axis of rotation. The urging member 350 has at least one flexible arm element (four shown) protruding from half of a circular body. The flexible arm element may have some elasticity. In other words the flexible arm element may be able to temporarily store elastic potential energy. Aptly the flexible arm element is made from rubber, plastic, metal, metal alloy, or the like. When the urging member 350 is rotated about the urging member shaft, the flexible arm elements pivot about the urging member shaft. The distance between neighbouring flexible arm elements may vary. Aptly the urging member 350 may have two states: deployed and stowed. In the deployed state, the urging member 350 may protrude into the media item trajectory 185. Aptly the urging member 350 may rotate in the deployed mode as media items 175 pass near the members 350. Aptly the urging member 350 may have a stowed station (as shown in FIG. 3) where the urging member 350 is rotates such that the flexible arms do not risk obstructing the media item trajectory 185. In FIG. 3, one of the flexible arm elements of the urging member 350 is in contact with an urging member restraint 351. The urging member restraint 351 is a generally rigid structure that may (partially) obstruct the path of a flexible arm element as it rotates (pivots) with the rest of the urging member 350. While the urging member restraint 351 is illustrated in FIG. 3 with a triangular cross section, it will be appreciated that other cross-sectional shapes will be sufficient to obstruct the path of a flexible arm element. Aptly the restraint 351 may have a cross-sectional shape of cylindrical, cuboidal, spherical, or the like.

Also shown in FIG. 3 is a transport guide surface 352, which may be the last point of contact with the media item 175 as it moves along the transport pathway portion 310 prior being released along the media item trajectory 185. Aptly the transport guide surface 352 may at least partially influence the media item trajectory 185. Aptly the transport guide surface 352 may be substantially flat, curved, concave, convex, or the like. Aptly the transport guide surface 352 may be constructed from a low-friction material. Aptly the transport guide surface 352 may be slotted and/or have protrudable elements.

Between the transport zone 172 and the storage zone 170 there is a transport zone wall 355. The transport zone wall 355 is generally rigid and may form an upper outer boundary of the storage zone 170. The transport zone wall 355 has a transport zone wall surface 357 that faces into the storage zone 170. Aptly media items 175 may abut the transport zone wall surface 357. Towards the sides of the storage zone 170 as illustrated in FIG. 3 there are a front wall 360 and a rear wall 362. It will be appreciated that the front wall 360 and the rear wall 362 may be elements of the storage receptacle 130. The walls 360, 362 are generally rigid elements made from plastic (although other materials could be used instead) which may define side boundaries of the storage zone 170. The front wall 360 has a front wall abutment surface 365. The rear wall 362 has a rear wall abutment surface 367. Although media items 175 in the stack 180 are not shown touching the walls 360, 362 it will be appreciated that as a single media item 175 is deposited at the storage zone 170, any part of the media item 175 (e.g. a leading edge) may abut the front wall abutment surface 365 and/or the rear wall abutment surface 367. Aptly the "front" wall 360 and the "rear" wall 362 may not imply any positional significance and may relate only to the arrangement shown in FIG. 3. Aptly the front wall 360 is a first storage zone wall. Aptly the rear wall 362 is a second storage zone wall. A top media item 370 is located in an uppermost position of the stack 180. A surface of the top media item 370 faces the transport zone wall surface 357. It will be appreciated that the top media item 370 does not refer to a specific media item; rather the media item 175 that is presently in the uppermost position of the stack 180. As more media items 175 are added to the stack 180, the physical position of the top media item 370 may remain mostly static because pusher plate 135 is moved downwards by the weight of the stack 180. On the right of FIG. 3 there is a front side 380 of the storage receptacle 130 and on the left is a rear side 385 of the storage receptacle 130. It will be appreciated that the sides 380, 385 are merely an indication to aid understanding.

The storage receptacle 130 also has two side walls 390 (one shown in FIG. 3). Aptly the side walls 390 may be side guides or the like. The side walls 390 may help to direct incoming media items 175 onto the stack 180. The side walls 390 may be parallel and spaced apart by a distance D. Aptly the distance D between side walls 390 may be between 10 mm and 500 mm, or between 150 mm and 220 mm, or any distance that corresponding to a long edge dimension of a banknote. Aptly the distance D between side walls 390 may be chosen to be slightly (e.g. +10 mm) greater than the long edge dimension of the media item 175 that is stored in the storage zone 170. It will be appreciated that in FIG. 3 a short edge of the media item 175 is visible. An inner side wall abutment surface 395 of the side wall 390 may face towards the stack 180. It will be appreciated that media items 175 may abut the side wall 390.

Aptly, the left side wall 390 and the right side wall 390 at each side of the stacking area 3 extend up sufficiently far to prevent the media items 175 becoming stranded above the left side wall 390 and the right side wall 390.

The side wall abutment surface 395 may be a flat plane or have multiple surfaces. The side wall abutment surface 395 may be substantially smooth. The side wall 390 also has a distal end surface 397 at an upper end region. The distal end surface 397 may contact the transport zone wall surface 357. It some embodiments the distal end surface 397 of the side wall 390 may be attached to the transport zone wall surface 357. In some embodiments the side wall 390 may extend right to the transport zone wall surface 357. Aptly the side wall distal end surface 397 may extend above the interface region 150 of the transport guide surface 352.

The inclusion of the features illustrated in FIG. 3, including the storage zone 170, transport zone 172, mover elements 160, urging members 350, and the like may optionally not be provided in the storage receptacle 130.

It will be appreciated that any embodiment of the present invention may be implemented by a computer. That is to say, instructions for carrying out any method disclosed herein may be stored on a non volatile storage medium and executed as a series of instructions on at least one processor of the computer. There may be a computer program comprising instructions which, when executed by at least one computing device, cause the computing device to carry out the steps of the method of the present invention.

Figure 4:
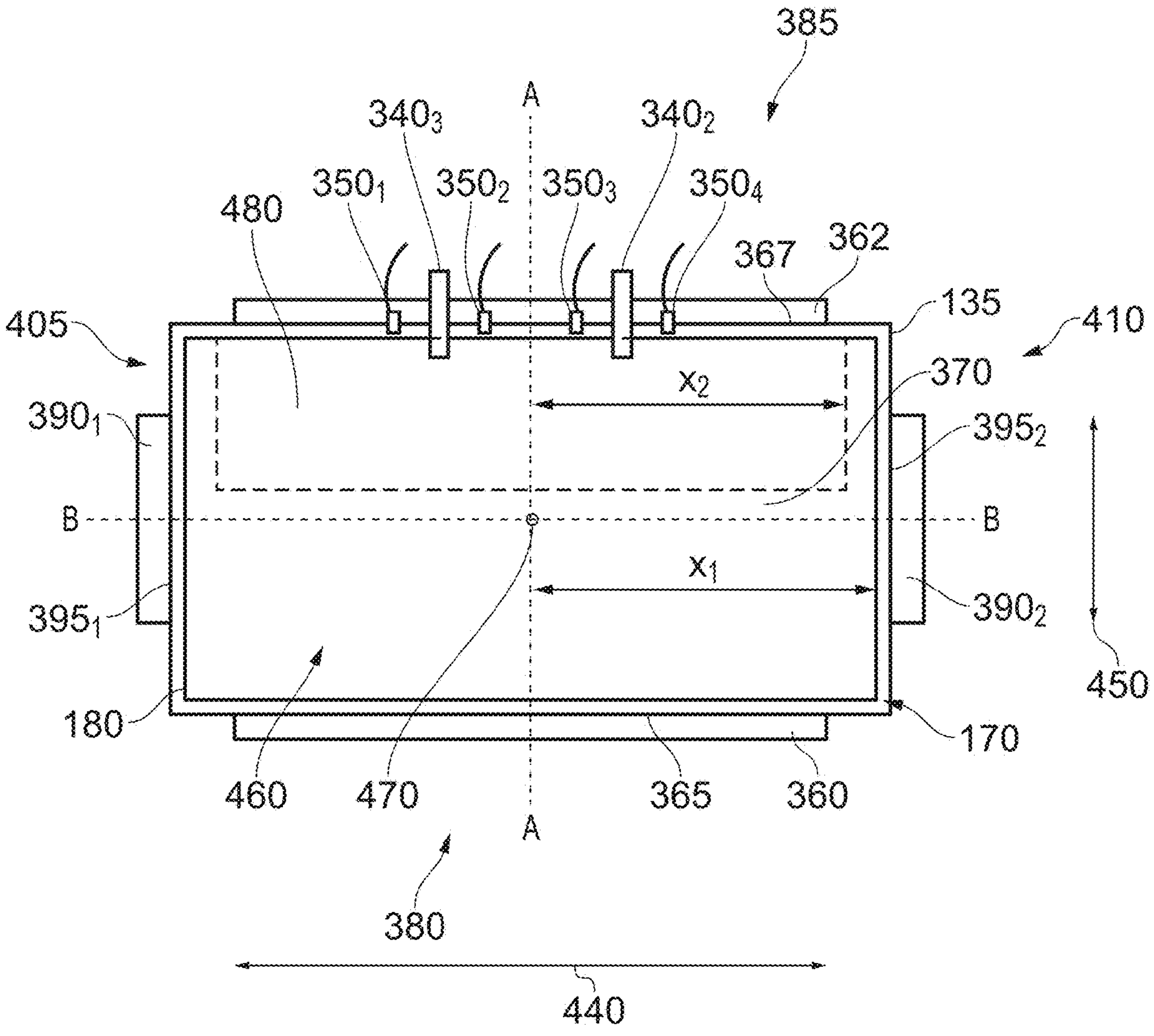
FIG. 4 is a top-down view of part of the storage receptacle of the terminal of FIG. 1.

FIG. 4 illustrates a cross-sectional top-down view of some elements of the storage receptacle 130. It will be appreciated that FIG. 4 is a diagrammatic representation of part of the storage receptacle 130 where only some features are shown. The skilled person would appreciate that additional features may be added to the storage receptacle 130. Furthermore, although features of the storage receptacle 130 are described in FIG. 4, it will be appreciated that any of the features may alternatively be provided elsewhere in the terminal 100, a SST or any other media handling apparatus (e.g., a casino machine, banknote counting device, or the like). The elements may not form part of a discrete receptacle such as a currency cassette or storage box or the like but may be duly located around a storage zone.

FIG. 4 shows the storage zone 170, where media items 175 may be stored. The media items 175 may be stored in the form of the stack 180 of media items 175 on the pusher plate 135 (a type of base element). It will be appreciated that as described with reference to the preceding Figures, the pusher plate 135 may be situated on a biasing element (such as one or multiple pusher plate springs or the like). The top media item 370 of the stack 180 of media items 175 is shown in FIG. 4. It will be appreciated that for the first media 175 stored in the storage receptacle 130, then the single stored media item 175 rests on the pusher plate 135 and is itself the top media item 370, whereas subsequent stored media items 175 rest on the preceding media item 175 in the stack 180.

It will be appreciated that as described with reference to FIG. 3, the media items 175 are moved into the storage zone 170 by at least one set of mover elements 160, which may include driven wheels 340 and driving wheels 330. The mover elements 160 are shown as located on the rear side 385 of the storage zone 170 and media items 175 are moved into the storage zone 170 from the rear side 385. The opposing side of the storage zone is the front side 380. The transport axis 450 is the axis within the plane defined by the top surface of the pusher plate (i.e. the plane of the Figure) from the rear side 385 to the front side 380. It will be appreciated that the transport axis 450 defines two opposing directions, that is to say both the transport direction from the rear side 385 to the front side 380 and vice versa. It will be appreciated that the transport axis 450 is defined with respect to the transport of media items 175 into the storage zone 170 and does not necessarily depend on the relative dimensions of the different sides of the media items 175 or the storage zone 170. The lateral axis 440 is the axis substantially perpendicular to the transport axis 450 within the plane defined by the top surface of the pusher plate (i.e. the plane of the Figure). That is to say, the lateral axis 440 defines the lateral direction from the left side 405 to the right side 410 and the opposing lateral direction from the right side 410 to the left side 405. It will be appreciated that while the sides of the storage zone 170 are described with reference to a particular direction, this is just for reference purposes and the storage zone 170 could be rotated and a user could input media items 175 on different sides.

It will be appreciated that through the features described herein the top media item 370 is moved closer to a desired location 460 to create the stack 180 of media items 175 where the stack 180 is an aligned stack. The desired location may be a location within a plane substantially parallel to the plane defined by the top surface of the pusher plate 135 but spaced apart and located at the top media item 370. In certain embodiments the desired location 460 may lie substantially in the centre of the storage zone 170.

A central point 470 of the desired location is substantially in the centre of the desired location 460 in both the lateral direction and the transport direction. A transport centre line A-A of the desired location 460 lies within the plane defined by the desired location 460 and substantially parallel to the transport axis 450 while passing through the central point 470. A lateral centre line B-B of the desired location 460 lies within the plane defined by the desired location 460 and substantially parallel to the lateral axis 440 while passing through the central point 470.

The transport centre line A-A defines a central transport plane associated with the desired location 360. The central transport plane is the plane containing the transport centre line A-A and substantially perpendicular to the plane defined by the desired location. That is to say, the central transport plane extends in a direction out the plane of FIG. 4 and is located at the centre of the desired location in the lateral direction.

The lateral centre line B-B defines a central lateral plane associated with the desired location 360. The central lateral plane is the plane containing the lateral centre line B-B and substantially perpendicular to the plane defined by the desired location. That is to say, the central lateral plane extends in a direction out the plane of FIG. 4 and is located at the centre of the desired location in the transport direction.

FIG. 4 shows the second driven wheel 340$_2$ and a third driven wheel 340$_3$ at the rear side 385 of the storage zone 170 located spaced apart along the lateral direction. The second driven wheel 340$_2$ and third driven wheel 340$_3$ are laterally spaced evenly apart either side of the central transport plane. It will be appreciated that other parts of the mover elements, including driving wheels, may not be shown in FIG. 4. It will be appreciated that according to certain embodiments, there may be more or less mover elements located at the rear side 385 of the storage zone 170.

FIG. 4 further shows a plurality of rear urging members 350 located at the rear side 385 of the storage zone 170. A first rear urging member 350$_1$, second rear urging member 350$_2$, third rear urging member 350$_3$, and fourth rear urging member 350$_4$ are located spaced apart along the lateral direction. The rear urging members 350 may be evenly spaced either side of the central transport plane. The rear urging members 350 act to urge the media items 175 in the transport direction towards the desired location 460. It will be appreciated that according to certain embodiments, there may be more or less urging elements located at the rear side 385 of the storage zone 170. Each rear urging member 350 may be provided in the form of a flicker wheel.

FIG. 4 shows a left side wall 390$_1$ and right side wall 390$_2$, located at opposing lateral sides of the storage zone 170. These may be examples of guide members. The left side wall 390$_1$ and right side wall 390$_2$ may have respective side wall abutment surfaces 395. That is to say the left side wall 390$_1$ may have a left side wall abutment surface 395$_1$ and the right side wall 390$_2$ may have a right side wall abutment surface 395$_2$. The side wall abutment surfaces 395 may substantially abut the media items 175 when the media items 175 are stored in the storage zone 170. The side walls 390 may be movable in a lateral direction to adjust the lateral dimensions of the storage zone 170 to accommodate media items 175 of different lateral dimensions.

The left side wall 390$_1$ may act as a guide member to urge the media items 175 in a lateral direction away from a left side peripheral region of the storage zone 170 towards the central transport plane associated with the desired location 460. The left side wall 390$_1$ may have a smooth surface finish. The left side wall 390$_1$ may be made of an injection moulded plastic material.

The right side wall 390$_2$ may act as a guide member to urge the media items 175 in a lateral direction away from a right side peripheral region of the storage zone 170 towards the central transport plane associated with the desired location 460. The right side wall 390$_2$ may have a smooth surface finish. The right side wall 390$_2$ may be made of an injection moulded plastic material.

The front side wall 360 may be located at the front side 380 of the storage zone 170. The front side wall 360 may have the front wall abutment surface 365. The front wall abutment surface 365 may substantially abut the media items 175 when the media items 175 are stored in the storage zone 170. The front side wall 360 may act as a guide member to urge the media items 175 in a transport direction away from a front side peripheral region of the storage zone 170 towards the lateral transport plane associated with the desired location 460. The front side wall 360 may have a smooth surface finish. The front side wall 360 may be made of an injection moulded plastic material.

The rear side wall 362 may be located at the rear side 385 of the storage zone 170. The rear side wall 362 may have the rear wall abutment surface 367. The rear wall abutment surface 367 may substantially abut the media items 175 when the media items 175 are stored in the storage zone 170. The rear side wall 362 may act as a guide member to urge the media items 175 in a transport direction away from a rear side peripheral region of the storage zone 170 towards the lateral transport plane associated with the desired location 460. The rear side wall 362 may have a smooth surface finish. The rear side wall 362 may be made of an injection moulded plastic material.

A first lateral distance $x_1$ corresponds to the distance in the plane of the desired location 460 and in a lateral direction from the central lateral plane to the edge of the desired location. The first lateral distance $x_1$ is equal to half the lateral width of the desired location. A second lateral distance $x_2$ corresponds to the distance in the plane of the desired location 460 and in a lateral direction from the central lateral plane to the edge of a deformed media item 480. It will be appreciated that the deformed media item 480 refers to the media item 175 while the media item 175 is deformed as described herein. The second lateral distance $x_2$ is less than the first lateral distance $x_1$ so that the media item 175 when in a deformed state is narrower than the width of the desired location 460 and thus the deformed media item 480 can enter the storage zone 170 without hitting the side walls 390.

Figure 5:
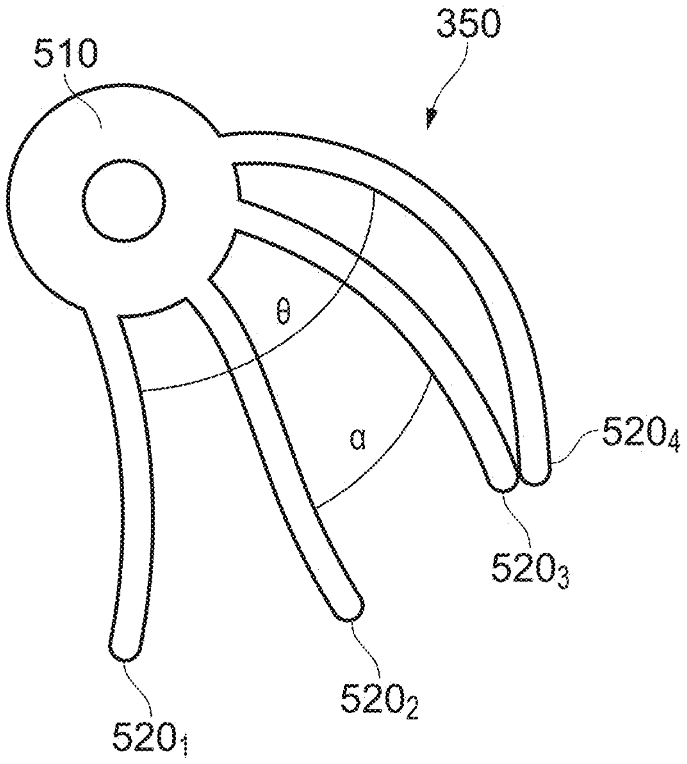
FIG. 5 is a side view of an urging member of the storage receptacle of the terminal of FIG. 1.
Figure 6:
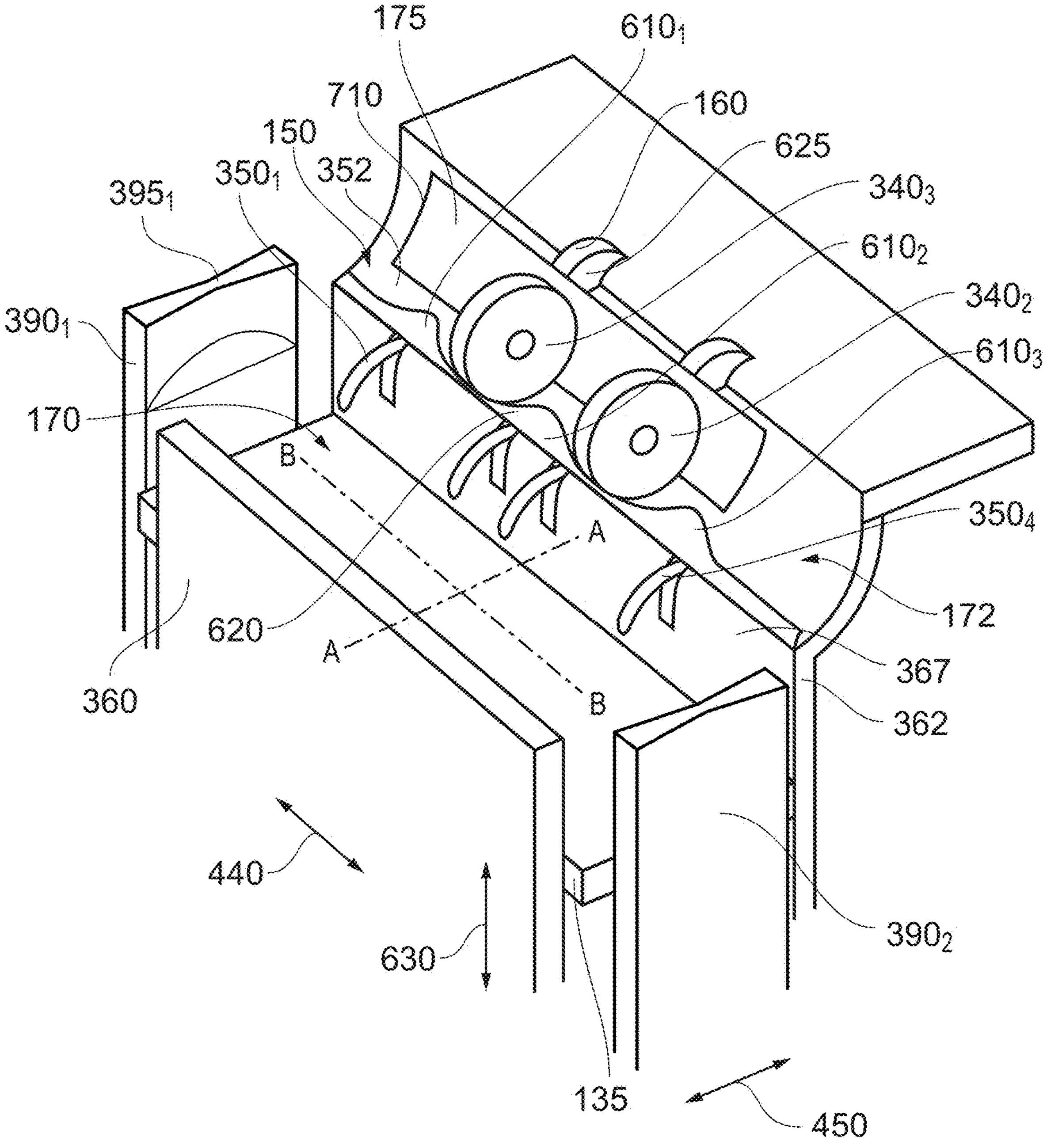
FIGS. 6 to 9 are cut-away perspective views of part of the storage receptacle of FIG. 3 in use.

FIG. 5 illustrates the rear urging member 350. The rear urging member 350 has a cylindrical body 510 and a plurality of arm elements 520 extending radially outwardly from the cylindrical body 510. The cylindrical body 510 is mounted on a rear urging member shaft. In this case the rear urging member 350 has four arm elements, a first arm element $\mathbf{520}_1$, a second arm element $\mathbf{520}_2$, a third arm element $\mathbf{520}_3$, and a fourth arm element $\mathbf{520}_4$. It will be appreciated that there may be a different number of arm elements 520 to that shown. The arm elements 520 are for engaging the media item 175.

Each arm element 520 may extend outwardly from the cylindrical body 510 by at least 10 mm. In this case each arm element 520 extends outwardly from the cylindrical body 510 by 15 mm. The arm elements 520 may be of a millable rubber material, such polyurethane. It will be appreciated that the arm elements 520 may be of a flexible material such that their shape can be deformed.

The angle $\Theta$ defined between the first arm element $\mathbf{520}_1$ and the fourth arm element $\mathbf{520}_4$ may be less than 160 degrees. For example the angle $\Theta$ defined between the first arm element $\mathbf{520}_1$ and the fourth arm element $\mathbf{520}_4$ may be less than 150 degrees. In this case the angle $\Theta$ defined between the first arm element $\mathbf{520}_1$ and the fourth arm element $\mathbf{520}_4$ is 140 degrees.

The angle $\alpha$ defined between each arm element 520 and an adjacent arm element 520 may be less than 50 degrees. For example the angle $\alpha$ defined between each arm element 520 and an adjacent arm element 520 may be less than 40 degrees. In this case the angle $\alpha$ defined between each arm element 520 and an adjacent arm element 520 is 35 degrees.

A media item deformer 620 may be provided on the transport guide surface 352. The media item deformer 620 may be provided in the form of a wave contoured contact surface for engagement with the media item 175. The media item deformer 620 may be provided in the form of an undulating support surface for engagement with the media item 175. In this case the media item deformer 620 includes three upwardly extending ribs 610 for engagement with the media item 175. That is to say there is a first rib $\mathbf{610}_1$, a second rib $\mathbf{610}_2$ and a third rib $\mathbf{610}_3$. Each rib 610 extends upwardly in a depth direction substantially orthogonal to the lateral direction. Each rib 610 may extend upwardly by at least 5 mm. For example each rib 610 may extend upwardly by 8 mm.

The media item deformer 620 is rotatable between a retracted configuration and a protruding configuration. In the protruding configuration the media item deformer 620 extends towards the transport pathway portion 310. In the retracted configuration the media item deformer 620 extends away from the transport pathway portion 310. Aptly, the protruding configuration may be a first state. Aptly, the retracted configuration may be a further state. Aptly, the protruding configuration or first state may be a default state.

The apparatus may include an actuator to move the media item deformer 620 between the retracted configuration and the protruding configuration. In this case the actuator is provided in the form of a rotatory solenoid actuator. Alternatively as described with respect to an alternative embodiment shown in FIGS. 12-16, the biasing element (such as the spring 1240 shown in FIG. 12) provides a passive biasing mechanism, such that the media item deformer 620 is maintained in a biased state in the protruding configuration when there is no external force (other than gravity) acting on the biased deforming member 620. Aptly, the media item deformer 620 may be maintained in the protruding configuration when the media item 175 is transported towards the desired location 460 in the storage zone 170. Aptly, the motion of the media item 175 itself when transported away from the desired location 460 in the storage zone 170 during a dispense transaction may overcome a biasing force provided by the biasing element to move the media item deformer 620 into the retracted configuration.

Figure 7:
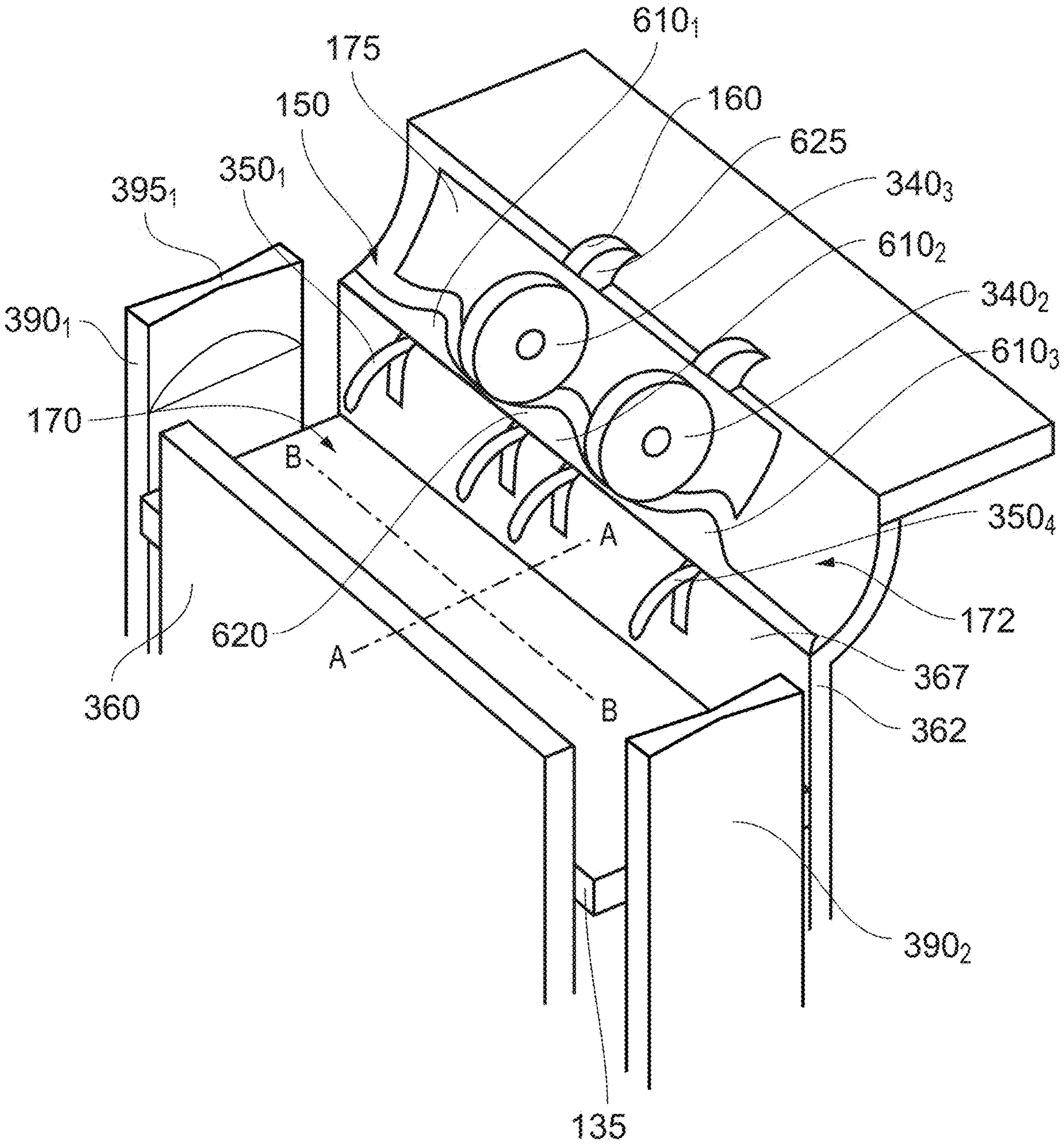
Figure 8:
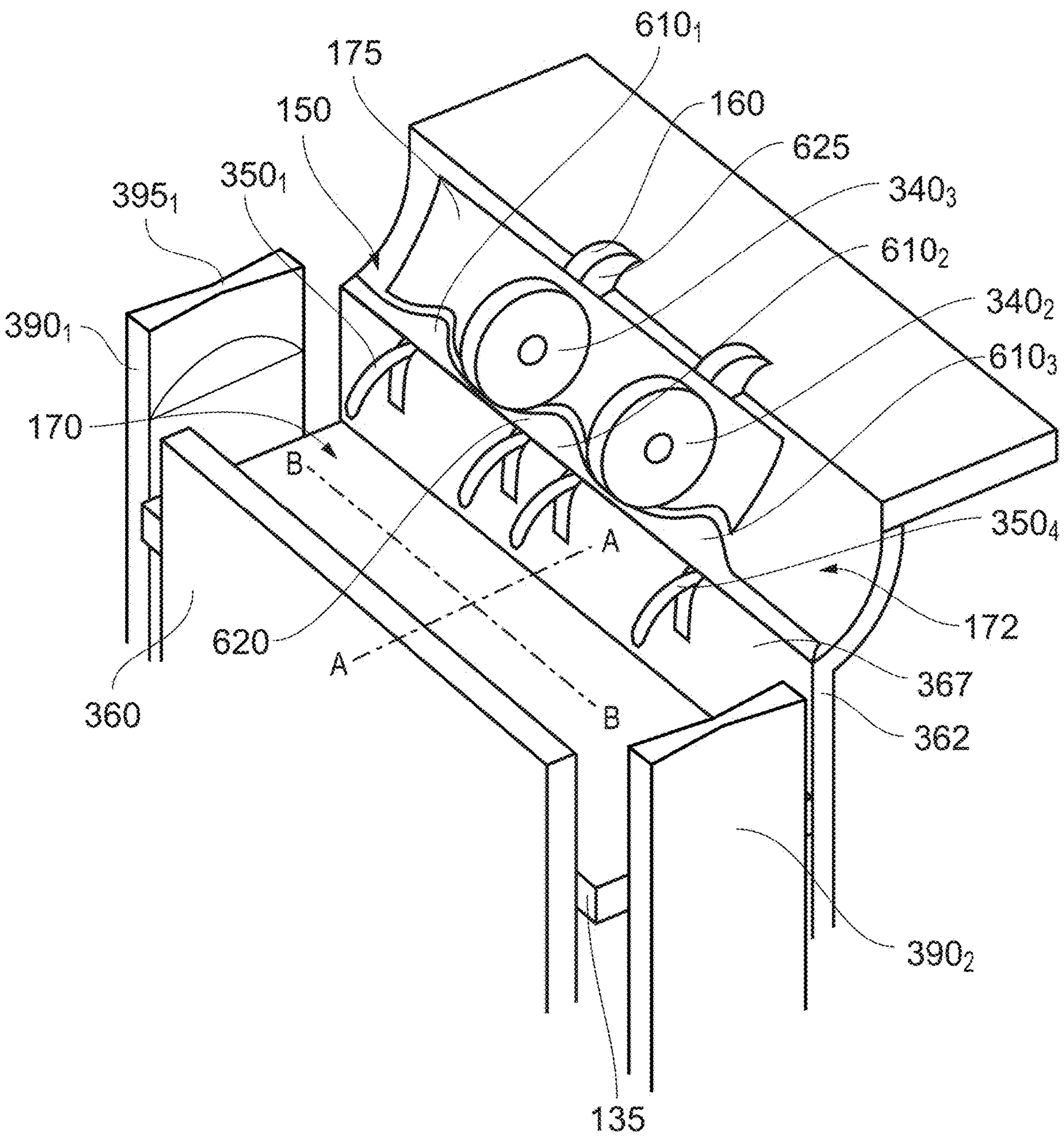
Figure 9:
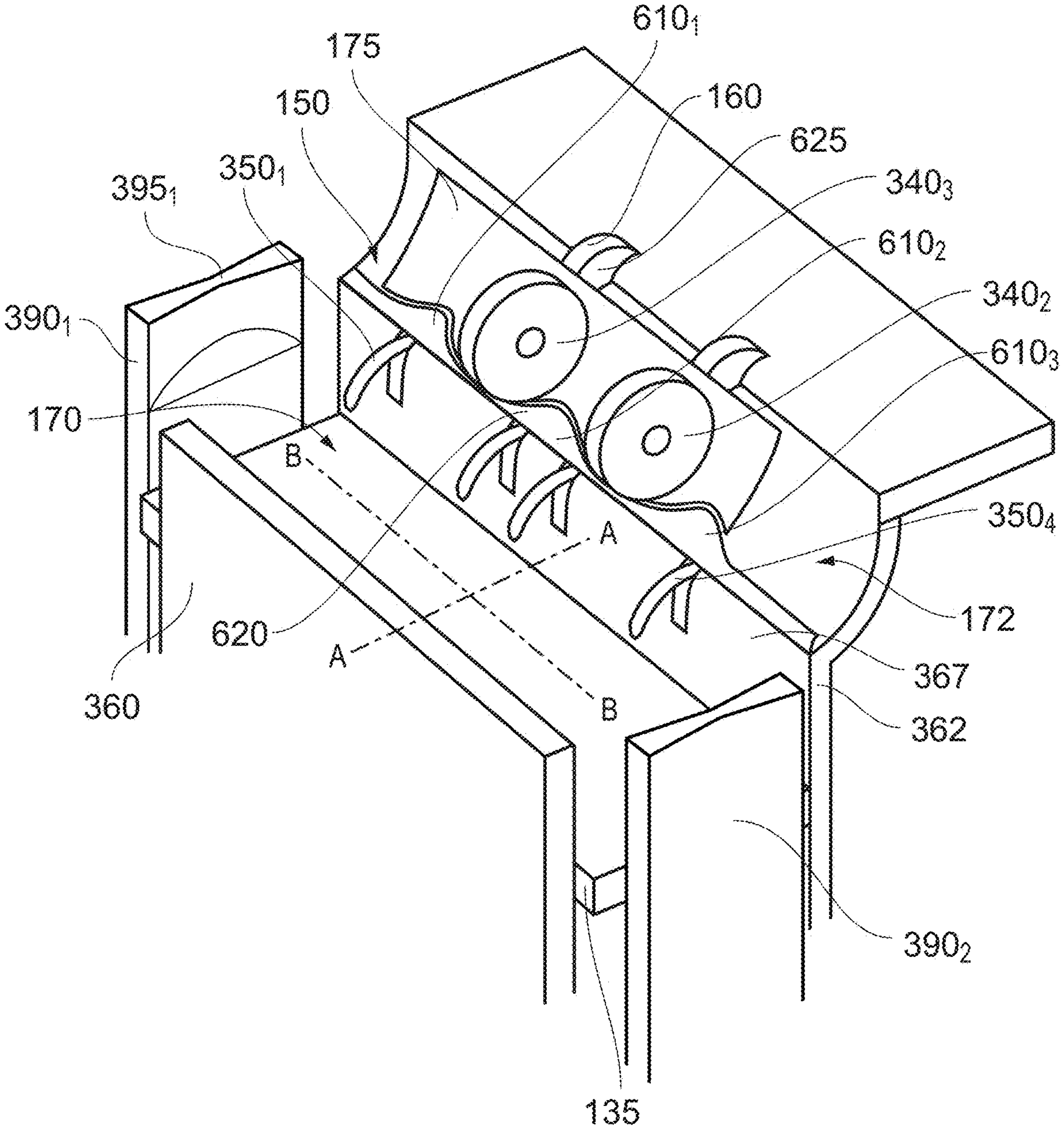

The media item deformer 620 is located adjacent to the interface region 150, and adjacent to the final set of mover elements before the storage zone 170. As the media item 175 passes over the wave contoured contact surface of the media item deformer 620 when in the protruding configuration, the shape of the media item 175 is adjusted, as illustrated in FIGS. 7 to 9. In this case the media item deformer 620 adjusts the shape of the media item 175 into a curved, corrugated shape to form the deformed media item 480. The axis of curvature of the curved deformed media item 480 is substantially orthogonal to the lateral axis 440.

By adjusting the shape of the media item 175, the media item deformer 620 acts to move the right side edge of the media item 175 inwardly in the lateral axis 440 away from the right side of the storage zone 170 towards central transport plane of the desired location 460. The media item deformer 620 may move the right side edge of the media item 175 inwardly by at least 6 mm. For example the media item deformer 620 may move the right side edge of the media item 175 inwardly by at least 8 mm. In this case the media item deformer 620 moves the right side edge of the media item 175 inwardly by 10 mm.

Similarly the media item deformer 620 acts to move the left side edge of the media item 175 inwardly in the lateral direction away from the left side of the storage zone 170 towards the central transport plane of the desired location 460. The media item deformer 620 may move the left side edge of the media item 175 inwardly by at least 6 mm. For example the media item deformer 620 may move the left side edge of the media item 175 inwardly by at least 8 mm. In this case the media item deformer 620 moves the left side edge of the media item 175 inwardly by 10 mm.

Figure 10:
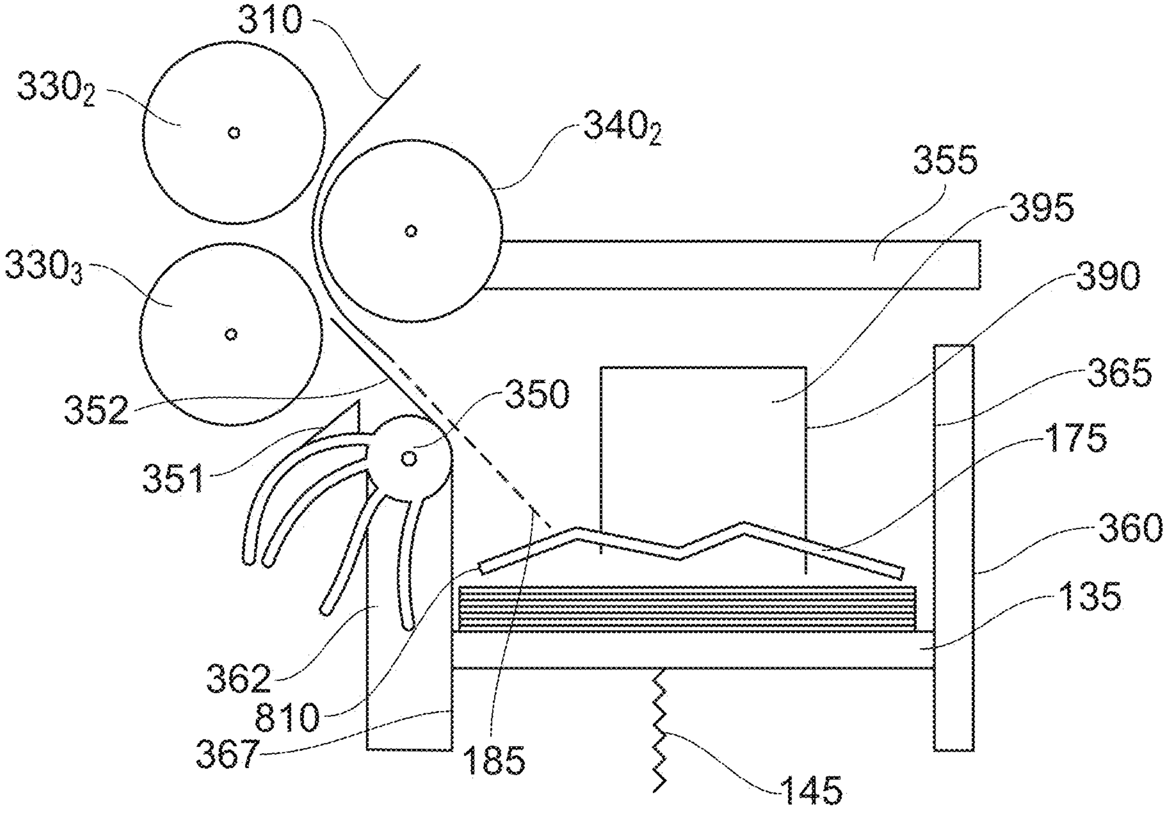
FIG. 10 is an enlarged cross-sectional side view of part of the storage receptacle of FIG. 3 in use.

If the media item 175 develops a fold or curve in the axis generally parallel to the lateral axis 440 or generally parallel to the long edge of the media item 175 as illustrated in FIG. 10, the media item deformer 620 and the resulting curved corrugation of the deformed media item 480 assists to flatten out the fold/curve in the axis generally parallel to the lateral axis 440 or generally parallel to the long edge of the media item 175.

The media item deformer 620 may be of a composite polymeric material. For example the media item deformer 620 may be of glass fibre reinforced polycarbonate.

As an alternative the media item deformer may include a lower contact surface for engagement with a lower surface of the media item 175 and a corresponding upper contact surface for engagement with an upper surface of the media item 175. The lower contact surface and the upper contact surface have corresponding mating shapes to engage the media item 175 between the lower contact surface and the upper contact surface. For example the media item deformer may include three upwardly extending ribs for engagement with the lower surface of the media item 175 and two corresponding downwardly extending ribs for engagement with the upper surface of the media item 175. Each rib extends upwardly in the vertical axis 630 substantially orthogonal to the lateral axis 440. Each rib may extend upwardly by at least 5 mm. For example each rib may extend upwardly by 8 mm.

As the media item 175 passes between the lower contact surface and the corresponding upper contact surface, the shape of the media item 175 is adjusted. In this case the media item deformer adjusts the shape of the media item 175 into a curved, corrugated shape of the deformed media item 480. The axis of curvature of the curved deformed media item 480 is substantially orthogonal to the lateral axis 440.

The storage receptacle 130 may be a scalable media recycle apparatus. In this case the terminal 100 may include a controller to move the media item 175 from the storage zone 170 through the transport pathway 110 back to the user opening 105 to dispense the media item 175 during a subsequent withdrawal transaction.

Alternatively the storage receptacle 130 may be an apparatus to only enable deposit of media item 175 without any subsequent dispensing.

In use, a customer inserts the media item 175 into the user opening 105 during a deposit transaction at the terminal 100. The media item 175 is transported along the transport pathway 110 through the upper module 101 and through the intermediate transport 103 to the lower module 104. The media item 175 enters the storage receptacle 130 through the respective port region 145. The driven wheels 340 of each pair of pinch point wheels are actively rotated by the motor driving rotation of the first shafts to move the media item 175 along the transport pathway portion 310 from the port region 145 to the storage zone 170. The media item 175 exits the transport pathway portion 310 through the interface region 150 and enters the storage zone 170.

The media item 175 exits the transport pathway portion 310 through the interface region 150. As the media item 175 passes over the wave contoured contact surface or undulating support surface of the media item deformed 620, the shape of the media item 175 is adjusted into the curved, corrugated shape of a deformed media item 480. This moves the right side edge of the media item 175 inwardly in the lateral axis 440 away from the right side of the storage zone 170 towards the central transport plane of the desired location 460, and moves the left side edge of the media item 175 inwardly in the lateral direction away from the left side of the storage zone 170 towards the central transport plane of the desired location. The deformed media item 480 enters the storage zone 170.

The rear urging member 350 is rotated by driven rotation of the rear urging member shaft. The arm elements 520 of the rear urging member 350 exert a discontinuous flicking urging action on the media item 175. In particular for each revolution of the rear urging member 350, the arm elements 520 of the rear urging member 350 deliver four flicking actions on the media item 175.

The arm elements 520 of the rear urging member 350 flick against the media item 175 to push the trailing edge of the media item 175 into the desired location 460 in the storage zone 170. When the media item 175 is in the storage zone 170, the arm elements 520 of the rear urging member 350 flick against the media item 175 to flatten the media item 175 in the desired location 460 in the storage zone 170. The arm elements 520 of the rear urging member 350 then flick against the media item 175 to draw the media item 175 rearwardly in the transport direction in the storage zone 170 into the desired location 460.

The media item 175 is stored as the top media item 370 in the stack 180. The rotatable rear urging members 350 flick the media item 175 to flatten the media item 175 in the storage zone 170. The light sensor determines the quantity of media items 175 stored in the storage zone 170. The pusher plate 135 is moved vertically based on the quantity of media items 175 stored in the storage zone 170.

To subsequently dispense the media item 175 from the storage zone 170, the plurality of rear urging members 350 are rotated to move the rear urging member 350 from the deployed configuration to the stowed configuration. This stows all of the arm elements out of the way to enable the media item 175 to be dispensed from the storage zone 170.

Similarly the media item deformer 620 is rotated from the protruding configuration to the retracted configuration. It will be appreciated as described in an alternative embodiment shown in FIGS. 12-16 that the state of the media item deformer 620 may be self-selected and moved into the retracted configuration automatically or passively by the action or motion of the media item 175 itself during a dispense-type transaction.

Figure 11:
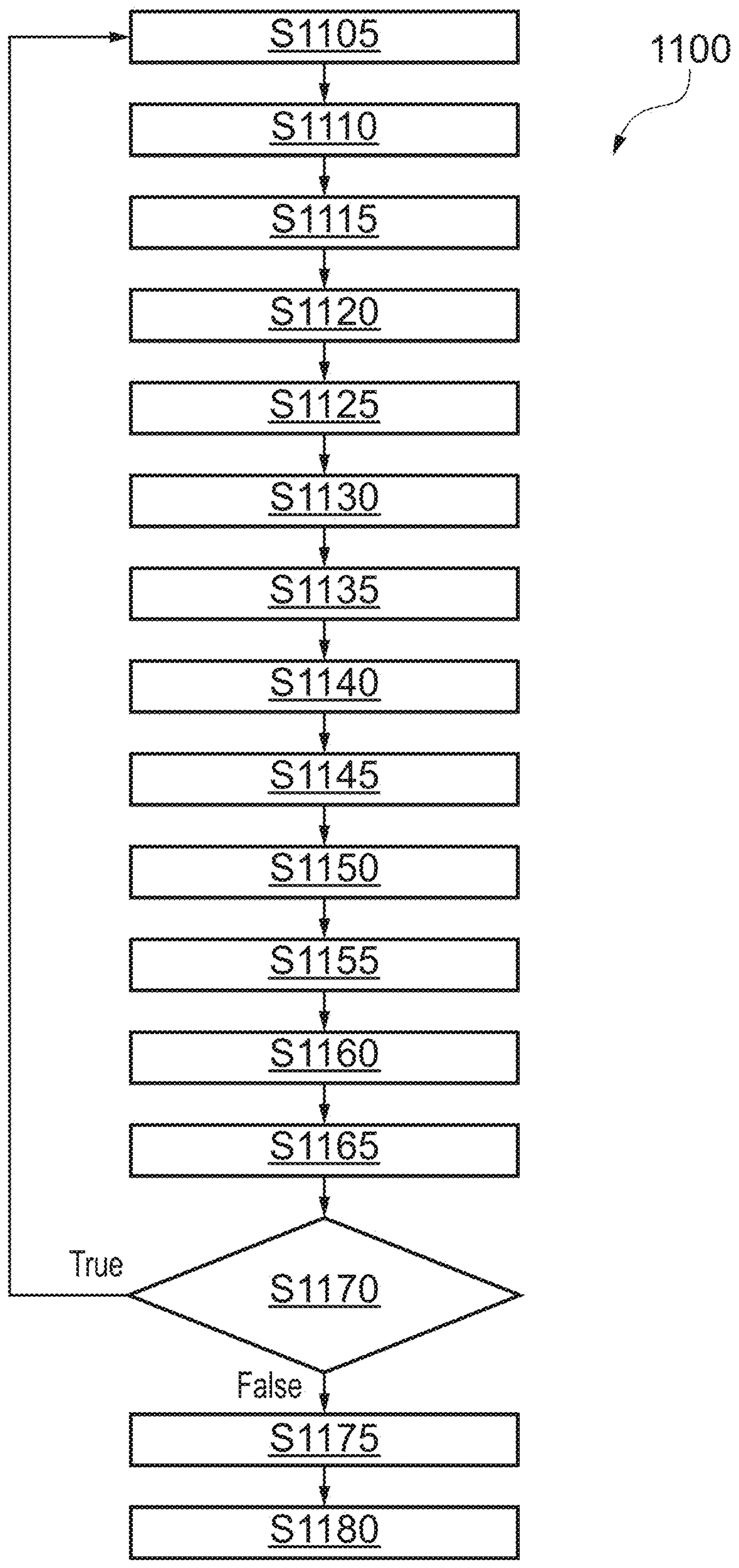
FIG. 11 is a flow diagram of a method for receiving deposited media according to the invention.

FIG. 11 illustrates a method 1100 for receiving media items 175, relating to at least the embodiment shown in FIGS. 1-10. It will be appreciated that a similar method may be used to dispense media items 175. It will be appreciated that a similar method may be used for the embodiment shown in FIGS. 11-16. The method 1100 may be carried out at the terminal 100. Aptly the method 1100 may be carried out at any media handling device. It will be appreciated that any of the steps outlined below may be executed in any order, consecutively and/or simultaneously. It will be appreciated that while the method 1100 refers to moving media items 175 into the storage zone 170 at the storage receptacle 135, the method 1100, or any subset of steps within the method 1100, could apply to the transport of media items 175 to any predetermined location within the terminal 100 or any media handling device.

The terminal 100 may include a variety of computing devices, each of which has at least one processor and a non-transitory computer-readable storage medium having executable instructions. The executable instructions when executed by the corresponding processor or processors from the corresponding non-transitory computer-readable storage medium causes the processor/s to have the SST perform operations discussed herein and below with respect to the components 102-180 of the terminal 100.

In a start step S1105, the terminal 100 is functioning normally and is not processing any media items 175. It will be appreciated that prior to the start step S1105 the terminal 100 may have been turned on and/or maintained by a technician, a type of user. At the start step S1105 the terminal 100 is in a "ready" state such that a user (e.g., a customer) may interact with the terminal 100. The start step S1105 may begin when the user operates the terminal 100 (e.g., depositing banknotes or cheques, withdrawing banknotes, or the like) and instigates a process at the terminal 100.

Once the process (e.g., a transaction) has begun, at a depositing step S1110 the user inserts a media item 175 into the user opening 105 of the terminal 100. It will be appreciated that a prerequisite may be that a shutter of the user opening 105 is retracted to provide an space at the user opening 105 for the user to place the media item(s) 175. Aptly the shutter may close after the terminal 100 detects the presence of the media item(s) 175.

Next in a first transporting step S1115, the media items 175 are moved through the upper module 102 of the terminal 100. In particular the media items 175 are moved along the transport pathway 110 in the upper module 102. It will be appreciated that the transport pathway 110 may be bounded by various rollers, wheels, belts, guide surfaces, or the like which help to direct the media item 175 along the transport pathway (an intended route). The media items 175 may be moved along the transport pathway 110 by at least one upper mover element 120.

Next in an optional processing step S1120, the media items 175 may pass by the imaging module 112 and/or the escrow module 114. The imaging module 112 may capture images of the media items 175 and send them to a processor of the terminal 100. The captured images may be used, for example, to determine the type of currency (e.g., country, denomination, ID, or the like). The escrow module 114 may temporarily store one or more media items 175 for later recall, either for returning the media items 175 to the user or continuing the transport process towards the lower module 104.

Then in a second transporting step S1125, the media items 175 are moved further along the transport pathway 110 towards the lower module 104. The media items 175 may pass through more upper mover elements 120 as they move along the transport pathway 110 before reaching the intermediate transport 103. It will be appreciated that media items 175 moving between the upper module 102 and the lower module 104 may pass through the intermediate transport 103. The media items 175 move in a generally downwards direction (as shown in FIG. 1) through the intermediate transport through hole 125 into the lower module 104. Aptly the media items 175 may pass through the safe wall 106 of the lower module 104. Aptly the media items 175 may enter the horizontal transport region 143.

Next in a third transporting step S1130 the media items 175 are moved in a generally horizontal direction through the horizontal transport region 143 near a top region of the lower module 104. It will be appreciated that "horizontal" here refers arrangements such as those illustrated in FIG. 1 and may be contrasted with a substantially "vertical" movement in the storage receptacle 130. The media item 175 is moved along the transport pathway 110 towards (and into) the second storage receptacle $\mathbf{130}_2$ (as illustrated in FIG. 1). It will be appreciated that in other embodiments—and depending on commands issued by the processor of the terminal 100—the media items 175 may be moved into any storage receptacle 130. Aptly the transport pathway 110 may be different. The media items 175 are diverted into the second storage receptacle $\mathbf{130}_2$ by the deflecting element 320 (shown in FIG. 3).

Next in an entering step S1135 the media items 175 pass through the port region 145 of the second storage receptacle $\mathbf{130}_2$. It will be appreciated that the port region 145 may represent a boundary of a specific storage receptacle 130. The path that media items 175 move along inside the storage receptacle 130 may be referred to as the transport pathway portion 310. The transport pathway portion 310 may be a section of the transport pathway 110 that is located in the storage receptacle 130.

Next in a fourth transporting step S1140 the media items 175 are moved by the mover elements 160 along the transport pathway portion 310 (for example as shown in FIG. 3) generally towards the storage zone 170. Motion may be imparted on each media item 175 by the driving wheel 330 and the driven wheel 340 which may grip outer surfaces of the media 175 as they rotate. Aptly a force may be exerted on the media item 175 at pinch points between the driving wheel 330 and the driven wheel 340. The media items 175 may move along the transport pathway portion 310 between the first driving wheel $\mathbf{330}_1$ and first driven wheel $\mathbf{340}_1$ then past the second and third driving wheels $\mathbf{330}_{2,3}$ and the second driven wheel $\mathbf{340}_2$. It will be appreciated that a final pinch point, when the media items 175 are moving towards the storage zone 170, is between the third driving wheel $\mathbf{330}_3$ and the second driven wheel $\mathbf{340}_2$.

Next in an actuating step S1142 the media item deformer 620 is operated and moves into the protruding configuration. It will be appreciated that the actuating step S1142 may be initiated by a sensor detecting the media item 175, at regular (timed) intervals, manually, or the like. Aptly the actuating step S1142 may be controlled by software and initiated by an instruction executed by the processor of the terminal 100. Alternatively, the actuating step S1142 may be controlled automatically and passively by the motion of the media item 175 itself, as described with respect to an embodiment shown in FIGS. 12-16. When the media item deformer 620 is in the protruding configuration, the shape of the media item 175 is manipulated (see FIGS. 7 to 9). For example, a dimension of the media item 175 may be reduced. In the present example the media item deformer 620 adjusts the shape of the media item 175 into a curved, corrugated shape to form the deformed media item 480. As mentioned previously, the axis of curvature of the curved deformed media item 480 may be substantially orthogonal to the lateral direction.

Next in a releasing step S1145 the media item 175 passes through the interface region 150 which may be a final contact point between elements of the storage receptacle 130 and the media item 175. Aptly the interface region 150 may denote a transition from the transport pathway portion 310 of the media item 175 to the media item trajectory 185. The media item deformer 620 at the interface region 150 may temporarily deform the media item 175 as it is released (ejected) from the final contact point. The wave shape of the media item 175 imparted by the media item deformer 620 may result in the right side edge of the media item 175 being moved inwardly in the lateral direction away from the right side of the storage zone 170 towards central transport plane of the desired location 460. Similarly the left side edge of the media item 175 can be moved inwardly in this way. After the interface region 150, the media item 175 may move without external influence (other than gravity and inertia) for a period of time, along the media item trajectory 185, before the media item 175 abuts another element of the storage receptacle 130.

Aptly the final contact point of the media item 175 may be the final pinch point between the driving wheel 330 and the driven wheel 340. Aptly the final contact point of the media item 175 may be at an end region (point) of the transport guide surface 352. Thereby, the final pinch point and/or the end region of the transport guide surface may help determine the media item trajectory 185. Aptly the media item trajectory 185 may represent an idealised path of a media item 175 as it moves unsupported between the interface region 150 and the desired location 460. Aptly the desired location 460 may represent an idealised location of an uppermost media item 175 on the stack 180 (or pusher plate 135, if the only item in the stack). At the desired location 460 the media item 175 may be centrally aligned to the stack 180 and/or to the storage zone 170 optionally in the lateral axis 440 and the transport axis 450.

Next in a first urging (positioning) step S1150, at least one rear urging member 350 may be rotated by a driven rear urging shaft to thereby exert a flicking action on the media item 175. For example, for each rotation of the rear urging member 350 the arm elements 520 may deliver four flicking (striking) actions on the media item 175. As the rear urging member 350 rotates, each arm element 520 of the rear urging member 350 engages against the rear urging member restraint 605 in turn. This engagement of the arm element 520 against the rear urging member restraint 605 may deform each arm element 520 in turn so that after passing the rear urging member restraint 605, the arm element 520 may be flicked towards the media item 175. The flicking action flicks the media item 175 optionally in a downwards direction towards the desired location 460 to flatten the media item 175 in the storage zone 170. The arm elements 520 of the rear urging member 350 may then flick against the media item 175 to draw the media item 175 rearwardly in the storage zone 170 in a direction along the transport axis 450 into the desired location 460.

Next in a second urging step S1155 the media item 175 may be urged towards the desired location 460 of the storage zone 170 by abutment surfaces of any combination of: the left side wall 390$_1$, right side wall 390$_2$, front wall 360, rear wall 362. That is to say if the media item 175 enters the storage zone 170 towards a certain wall 390$_{1,2}$, 360, 362 then the abutment surface acts to urge the media item 175 towards the desired location 360.

Next in a locating step S1165, the media item 175, having been urged towards the desired location 460 in the storage zone 170 by action of urging steps S1150-S1155, is then stored at the desired location 460 as the top media item 370 in the stack 180.

The above steps S1105 to S1165 may refer to a single media item 175. When more than one media item 175 is received at the terminal 100, at a determining step S1170, the steps may be repeated for each subsequent media item 175. Aptly for N media items 175 received at the terminal 100, the above steps S1105 to S1165 may be repeated N times. Aptly, when another media item 175 needs processing, the determining step S1570 is true. Aptly, when no more media items 175 need processing, the determining step S1570 is false. Aptly after the locating step S1165 is completed for a first media item 175, if another media item 175 has been received, the method may continue from step S1105. Media items are transported one-by-one through the port region and thereafter to the desired location. Aptly an incoming item may enter the port region only when a previous media item has been duly located at the desired location. Alternatively, whilst still being processed one-by-one an incoming media item may be introduced via the port region before the preceding media items has come to rest at the desired location.

Then in an adjusting step S1175 the pusher plate 135 is moved vertically (optionally downwards) based on a quantity of media items 175 stored in storage zone 170 such that top media item 370 of stack 180 always sits at desired location 460. As an incoming media item 175 is located on the stack 180, the weight of the incoming media item 175 may cause the biasing element (spring) 140 to compress moving the pusher plate 135 downwards by a distance equal to a thickness of the incoming media item 175.

Finally in an end step S1180 an aligned stack is provided. The stack 180 may be an aligned stack when each media item 175 has been located at the desired location 460 one-by-one before the next media item 175 is located on top of the previous media item and at the desired location 460. All media items 175 in the aligned stack may have edges that are substantially parallel and/or zero offset and/or zero skew relative to neighbouring media items 175. Media items 175 may enter the storage zone 170 in turn and each media item 175 may itself be moved to desired location 460 by the method described above.

It will be appreciated that any of the above steps S1105-S1180 may be carried out in the reverse order during dispensing at least one media item 175 from the storage zone 170. It will be appreciated that during dispensing media items 175, certain elements, for example the rear urging elements 350, may be moved to a retracted or stowed configuration to allow for transport of the media item 175 along the transport pathway 110 (via the transport pathway portion 310) from the storage zone 170 to the user opening 105. It will be appreciated that certain other components, for example at least one pick wheel (an example of a drive member), may be present for dispensing media items 175.

Referring to FIGS. 12 to 16 there is illustrated the storage receptacle 130 containing a biased deforming member 1205 according to an alternative embodiment. It will be appreciated that the biased deforming member 1205 is an example of a media item deformer. It will be appreciated that the alternative embodiment shown in FIGS. 12-16 includes substantially the same features and operates in substantially the same fashion as shown in FIGS. 1-10, with the biased deforming member 1205 replacing the media item deformer 620 shown in FIGS. 1-10.

Figure 12:
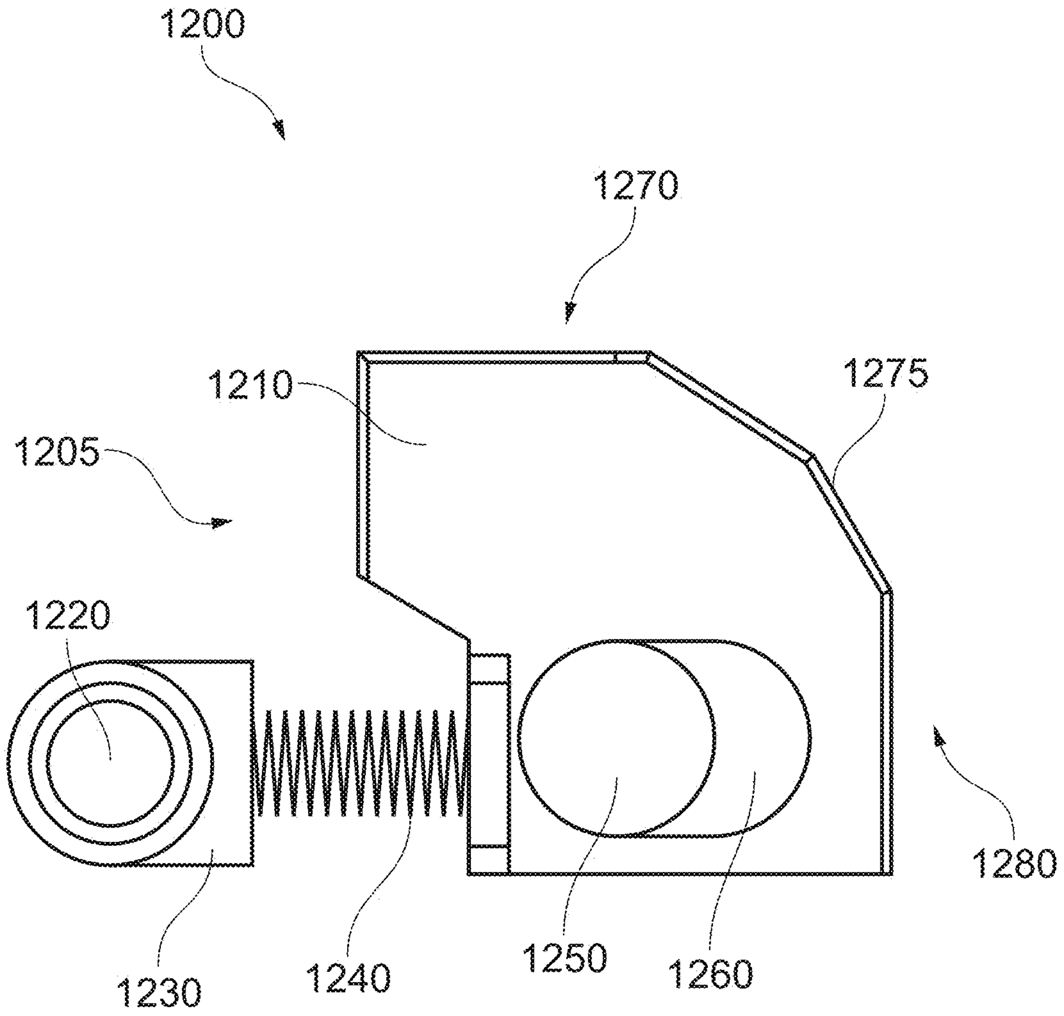
FIG. 12 is a side view of a media item deformer in a first state according to an alternative embodiment.
Figure 13:
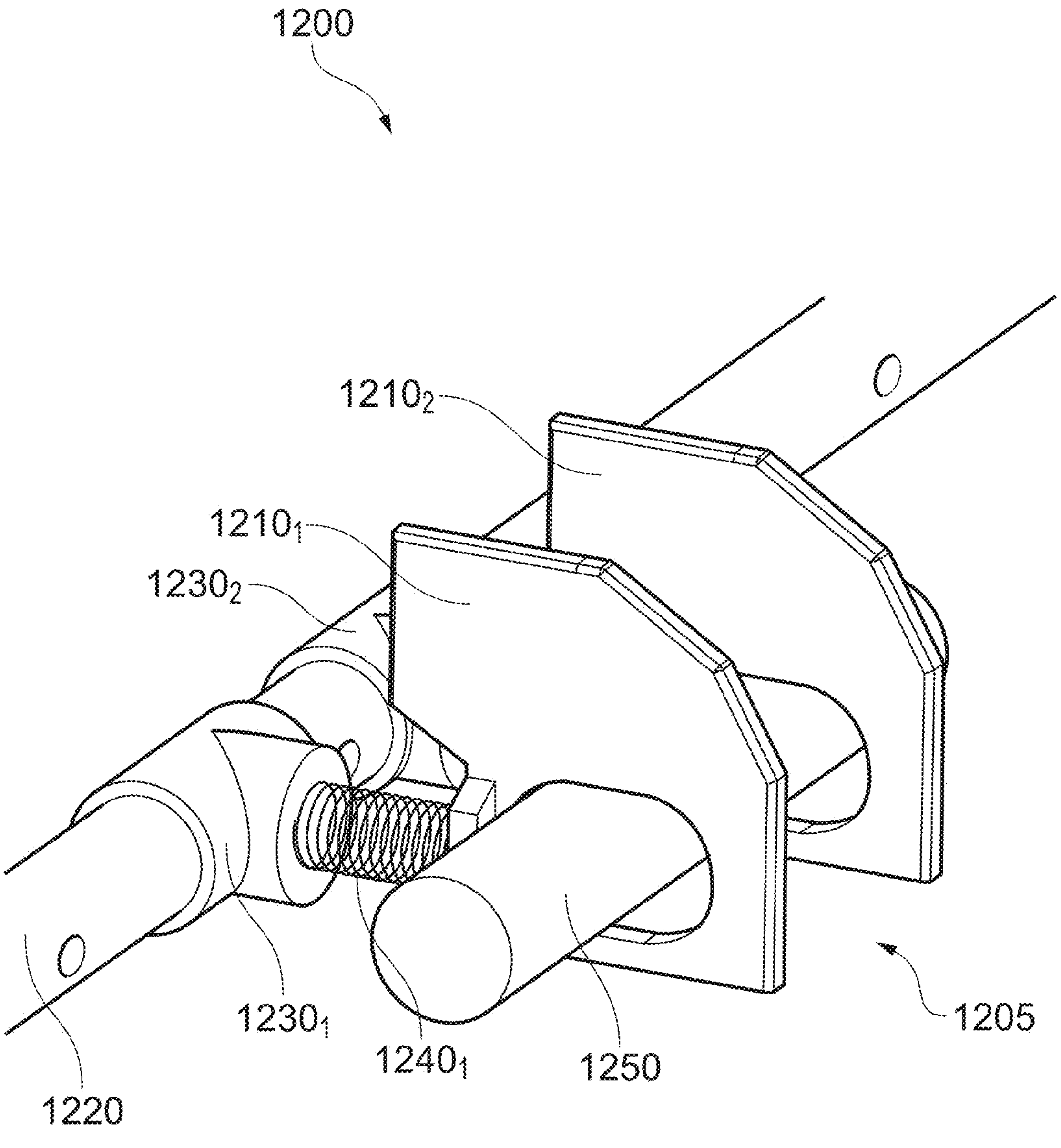
FIG. 13 is a perspective view of the media item deformer of FIG. 12.

FIGS. 12 and 13 illustrate the biased deforming member 1205 in more detail in a first state 1200. FIG. 12 illustrates a side view of the biased deforming member 1205. FIG. 13 illustrates a perspective view of the biased deforming member 1205. Although the biased deforming member 1205 is described as being located in the storage receptacle 130 (for example as illustrated in FIGS. 6-10), in alternative embodiments the biased deforming member 1205 may be located in the upper module 102, in a Self Service Terminal (SST), or in a media handling device, or the like.

The biased deforming member 1205 includes the biased plate elements 1210$_{1,2}$. It will be appreciated that the biased deforming member 1205 may include one, two, three or more biased plate elements 1210. The biased deforming member 1205 has a mounting shaft 1220. The mounting shaft 1220 is a rigid cylindrical element that may extend across a length of the storage receptacle 130. Aptly the mounting shaft 1220 may have a square, triangular, tubular, or the like cross section. It will be appreciated that the mounting shaft 1220 may be joined to other components of the storage receptacle 130. A bracket 1230 is attached, via a linear spring 1240 (an example of a biasing element), to the biased plate element 1210. The bracket 1230 has a hollow tubular body with a perpendicular mounting face located halfway along its length equidistant from a first open mouth and a further open mouth. Aptly a diameter of the first and/or further open mouth may be comparable to a diameter of the mounting shaft 1220. The bracket 1230 may be slidable along the mounting shaft 1220. The spring 1240 is shown slightly compressed from its equilibrium position in FIG. 12. It will be appreciated that the spring 1240 may be welded, glued, press-fit, or the like, to the biased plate element 1210 and/or the bracket 1230. Also, whilst the spring 1240 is illustrated with a circular axial section the spring 1240 could alternatively have a square, triangular, or the like section profile. Aptly the spring 1240 has a spring constant k of 0.01, 0.1, 1, 10, 100, 1000 N/m or the like. Aptly the spring 1240 may be constructed of a steel, a plastic, a metal alloy, ceramic, or the like. The compressed spring 1240 may provide a biasing force. Aptly the biasing force may act outwards (towards the left and right sides of FIG. 12) relative to the spring 1240. Aptly the spring 1240 may exert the biasing force on the biased plate element 1210 and through that on a guide shaft 1250 causing it to bias towards the first state 1200. The guide shaft 1250 that may contact one or more biased plate elements $\mathbf{1210}_{1,2}$.

The biased plate element 1210 has a substantially constant cross-section in one dimension and is thin relative to its height and width. Aptly the biased plate element 1210 may not have a plate-like shape and/or a substantially constant cross-section in one dimension. The biased plate element 1210 illustrated in FIGS. 12-14 has a broadly square profile with a bevel on one side consisting of two straight edges. Aptly the biased plate element 1210 may have a bevel consisting of more than two edges; a square, rectangular, or circular profile; at least one rounded, chamfered, or concave edge; or the like. The biased plate element 1210 contains a slot 1260 near a lower edge of the element 1210. The slot (slit) 1260 is a pill-shaped through-hole in the biased plate element 1210. The slot 1260 may have flat or angled internal surfaces. Aptly the slot 1260 may be circular, square, or the like. The guide shaft 1250 extends through the slot 1260, thereby limiting movement of the biased plate element 1210 to a single axis along which the guide shaft 1250 slides freely against surfaces of the slot 1260.

Figure 14:
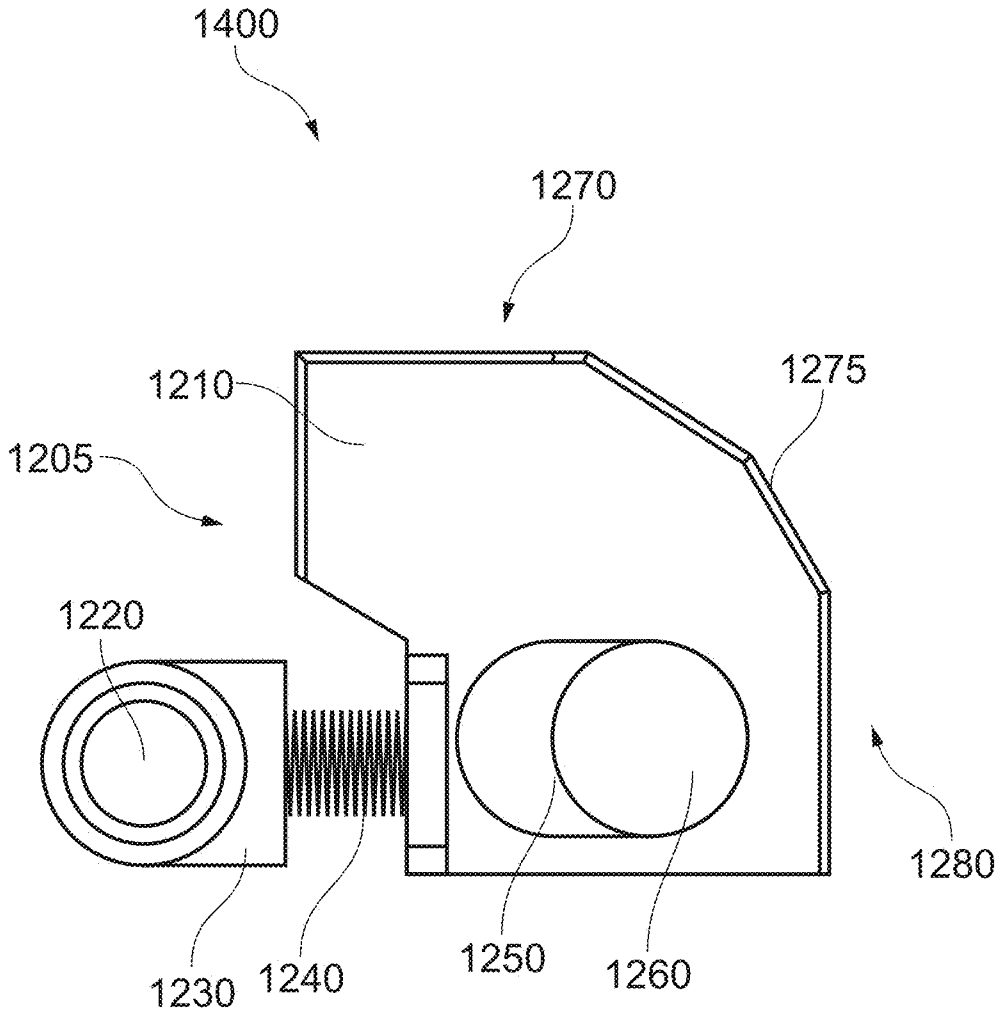
FIG. 14 is a side view of the media item deformer of FIG. 12 in a further state.

The first state 1200 may be defined by when the guide shaft 1250 abuts against a first distal surface of the slot 1260. Aptly the first distal surface may be a leftmost surface of the slot 1260 (as shown in FIGS. 12-14). Aptly a surface of the guide shaft 1250 and the first distal surface of the slot 1260 may be driven into contact by the spring 1240. Aptly the first distal surface may alternatively be a rightmost surface of the slot 1260. It will be appreciated that "left" and "right" may herein refer to a side closest to and furthest from the mounting shaft 1220 respectively. Aptly the first state is an example of a protruding configuration of the biased plate elements $\mathbf{1210}_{1,2}$. Aptly the biased plate elements $\mathbf{1210}_{1,2}$ may protrude through the transport guide surface 352 optionally at the interface region 150 (see FIGS. 6-9). Aptly a protruding region of the biased plate element 1210 may be a rib.

The biased plate element 1210 has a horizontal abutment region 1270 which is part of an abutment surface 1275. The abutment surface 1275 extends from a first extreme edge to a spaced-apart second extreme edge. In the current embodiment, as illustrated in FIG. 12, the first extreme edge is a top left corner of the biased plate element 1210 and the second extreme edge is a bottom right corner of the biased plate element 1210. In general the abutment surface 1275 may be one or more faces of the biased plate element 1210 that are intended to contact media items 175 at some point. Aptly the horizontal region 1270 may be perpendicular to the axis of movement of the guide shaft 1250 in the slot 1260. Aptly the horizontal region 1270 may be a top abutment region. The abutment surface 1275 also has a vertical abutment region 1280. Aptly the vertical region 1280 may be parallel to the axis of movement of the guide shaft 1250 in the slot 1260. Aptly the vertical region may be a side abutment region.

As mentioned previously, the biased deforming member 1205 is shown in the first state 1200. Aptly the first state 1200 may be a default state. Aptly in the first state 1200 the biased plate elements $\mathbf{1210}_{1,2}$ may deform media items 175 which contact the biased plate elements $\mathbf{1210}_{1,2}$. Aptly there may be at least one wheel disposed laterally between, and intruding at least partially into an extent of, the biased plate elements $\mathbf{1210}_{1,2}$. In some embodiments there may be a pair of spaced-apart interposed biased deforming members 1205 along the transport pathway portion 310 that cooperate to deform incoming media items 175. In some embodiments there may be one or more spaced-apart driving wheels 330 interposed with the biased deforming member 1205 along the transport pathway portion 310 that cooperate to deform incoming media items 175. In some embodiments there may be one or more spaced-apart driven wheels 340 interposed with the biased deforming member 1205 along the transport pathway portion 310 that cooperate to deform incoming media items 175.

FIG. 14 illustrated the biased deforming member 1205 in a further state 1400. Aptly the further state 1400 is an example of a retracted configuration of the biased plate elements $\mathbf{1210}_{1,2}$. That is to say the biased plate elements $\mathbf{1210}_{1,2}$ do not protrude through the transport guide surface 352 in the retracted configuration. Aptly the biased plate elements $\mathbf{1210}_{1,2}$ may protrude by only a negligible degree through the transport guide surface 352. Aptly the transport guide surface 352 may be generally uniform in the further state 1400. Aptly "retracted" may mean little or no protrusion.

It will be appreciated that the further state 1400 differs from the first state 1200 in that the guide shaft 1250 now abuts a further distal surface of the slot 1260. Aptly the further distal surface may be a rightmost surface of the slot 1260 (as shown in FIGS. 12-14). Aptly a surface of the guide shaft 1250 and the further distal surface of the slot 1260 may be driven into contact by a contact force of an external object (e.g., a media item) in opposition to the force provided by the spring 1240. Aptly the further distal surface may alternatively be a leftmost surface of the slot 1260. It will be appreciated that "left" and "right" may herein refer to a side closest to and furthest from the mounting shaft 1220 respectively.

The biased deforming member 1205 may be changed from the first state 1200 to the further state 1400 by a contact force exerted by the media item 175 on the vertical region 1280 of the abutment surface 1275. Aptly the biased deforming member 1205 may automatically and/or passively change state. Aptly the biased deforming member 1205 may passively change from the first state 1200 to the further state 1400 due to action of a media item. Aptly the further state 1400 may be maintained whilst the contact force is greater than the biasing force provided by the spring 1240. That is to say in some embodiments once the media item 175 no longer abuts the vertical region 1280 (optionally with sufficient force) then the biased deforming member 1205 returns to the first state 1200. It will be appreciated that due to the geometry of the biased deforming member 1205, the direction at which a media item approaches and subsequently abuts the biased plate element 1210 may determine whether the biased deforming member 1205 changes state. Aptly when the media item 175 exerts a force on the biased plate element 1210 in a generally perpendicular direction relative to the spring 1240 the biased deforming member 1205 may not change from the first state 1200 to the further state 1400. Aptly when the media item 175 exerts a force on the biased plate element 1210 in a generally parallel direction relative to the spring 1240 the biased deforming member 1205 may change from the first state 1200 to the further state 1400 optionally providing the force has sufficient magnitude. Aptly the biased deforming member 1205 may be in (or enter) the further state 1400 whilst (or when) a contact force of 0.01, 0.1, 1, 10, 100, 1000 N or the like is applied at the vertical region 1280.

Aptly the biased plate element 1210 may move in a linear pathway between the first state 1200 and the further state 1400 as defined by the guide shaft 1250 sliding along the slot 1260.

Figure 15:
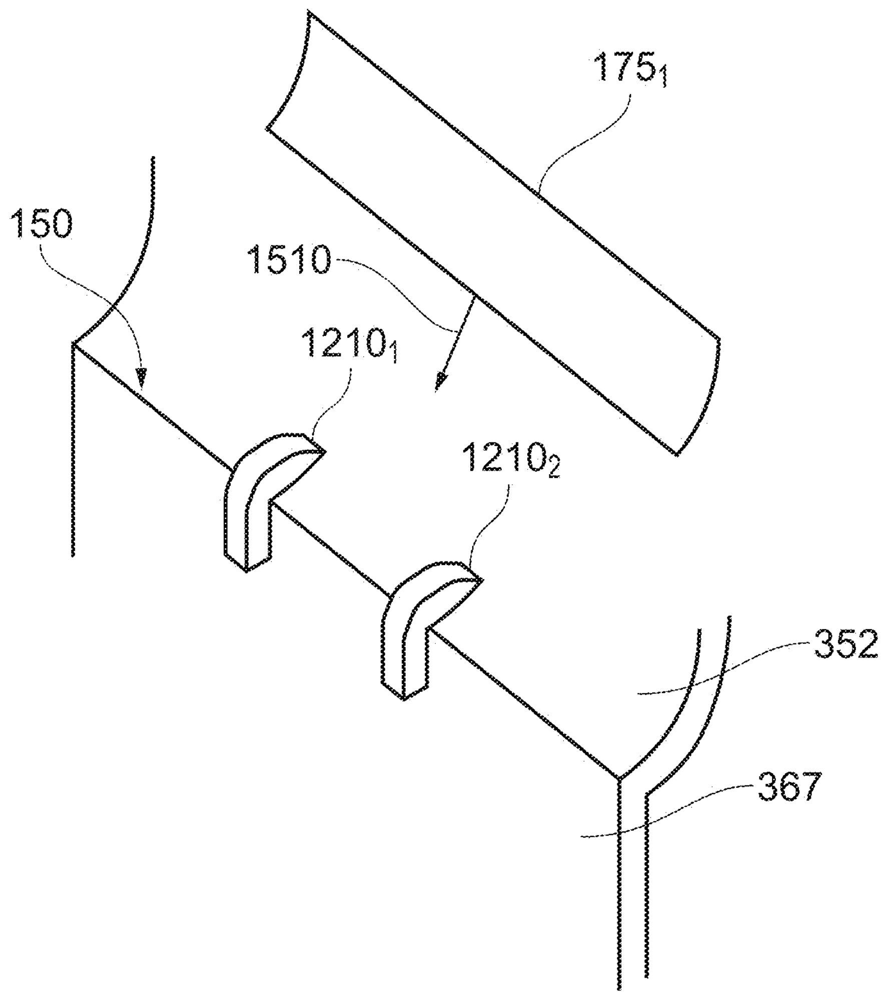
FIG. 15 is a perspective view of part of the storage receptacle with the media item deformer of FIG. 12 in the first state.

FIG. 15 illustrates a portion of the storage receptacle 130 at the interface region 150. It will be appreciated that some features are not shown in FIG. 15 to aid understanding. For example, opposing elements (e.g. opposing biased deforming member/s 1205 and/or opposing driving wheel/s 330 and/or opposing driven wheel/s 340) are not illustrated, but it will be appreciated that they may cooperate with the biased plate elements $\mathbf{1210}_{1,2}$ to deform media items 175. The biased plate elements $\mathbf{1210}_{1,2}$ are shown in the first state 1200 (protruding configuration). It will be appreciated that the biased deforming member 1205 may be arranged as illustrated in FIGS. 12 and 13 such that the biased plate elements $\mathbf{1210}_{1,2}$ protrude above the transport guide surface 352. It will be appreciated that the exposed portion of the biased plate elements $\mathbf{1210}_{1,2}$ may be respective abutment surfaces 1275. Aptly the exposed portion of the biased plate element 1210 may be referred to as a rib or a biased rib element. Aptly the biased plate element 1210 may be referred to as an upwardly extending rib.

In FIG. 15, an incoming media item $\mathbf{175}_1$ approaches the interface region 150 in the general direction defined by an incoming media item pathway 1510. Aptly the incoming media item pathway 1510 may correspond to the transport pathway portion 310. The incoming media item $\mathbf{175}_1$ may be transported towards the predetermined location and optionally subsequently the desired location 460. The incoming media item $\mathbf{175}_1$ contacts the horizontal (top) region 1270 of the biased plate elements $\mathbf{1210}_{1,2}$ therefore the biased plate elements $\mathbf{1210}_{1,2}$ do not move towards the further state 1400 (or retract by only a negligible degree). The incoming media item $\mathbf{175}_1$ is deformed by the biased plate elements $\mathbf{1210}_{1,2}$. The deformed incoming media item $\mathbf{175}_1$ continues towards the desired location 460.

Figure 16:
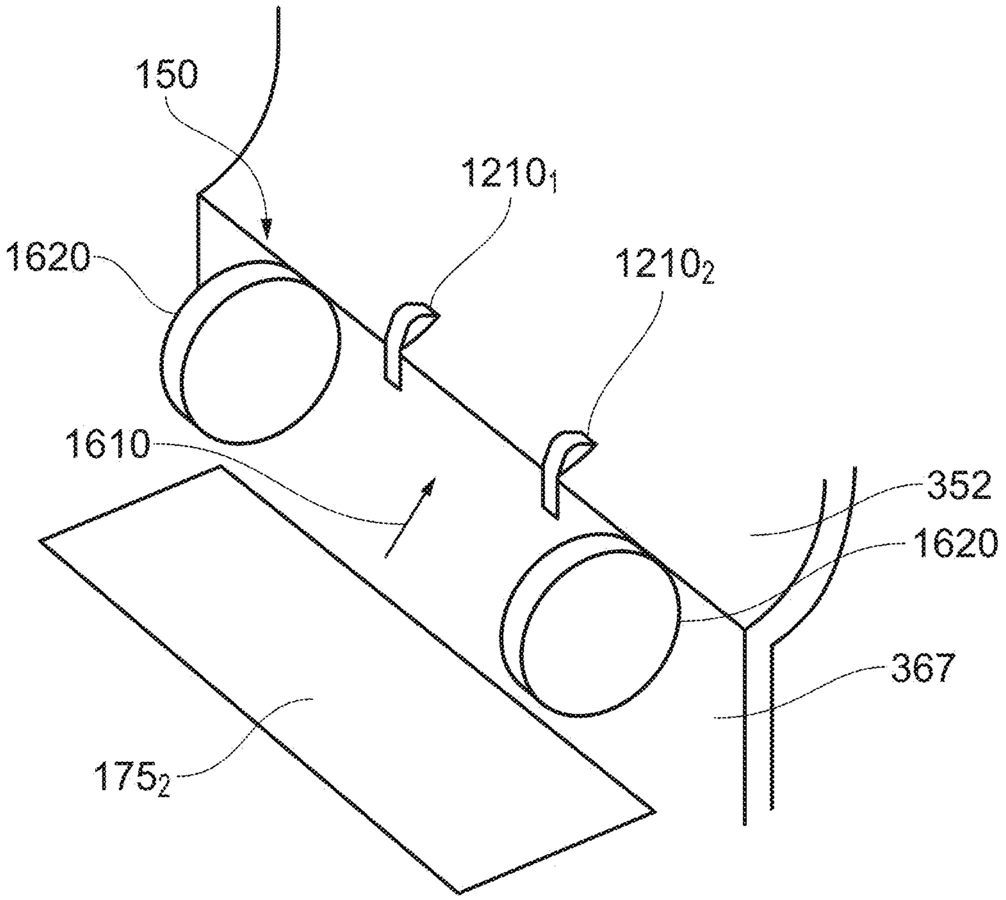
FIG. 16 is a perspective view of part of the storage receptacle with the media item deformer of FIG. 12 in the further state.

FIG. 16 illustrates a portion of the storage receptacle 130 at the interface region 150 (similar to FIG. 15). It will be appreciated that some features are not shown in FIG. 16 to aid understanding. For example, opposing elements (e.g. opposing biased deforming member/s 1205 and/or opposing driving wheel/s 330 and/or opposing driven wheel/s 340) are not illustrated. It will further be appreciated that FIG. 16 illustrates a withdrawal process in which a media item is transported away from the predetermined location for dispensing. The biased plate elements $\mathbf{1210}_{1,2}$ are shown in the further state 1400 (retracted configuration). It will be appreciated that the biased deforming member 1205 may be arranged as illustrated in FIG. 14 such that the biased plate elements $\mathbf{1210}_{1,2}$ are retracted and thus do not protrude (or protrude only to a negligible degree) above the transport guide surface 352.

In FIG. 16, an outgoing media item 1752 approaches the interface region 150 in the general direction defined by an outgoing media item pathway 1610. The outgoing media item 1752 may be the top media item 370. The outgoing media item 1752 may be moved by one or more pick wheels 1620 (two shown) (an example of a drive member) and thereby driven along the outgoing media item pathway 11210. The outgoing media item 1752 may be transported away from the predetermined location and optionally subsequently the user opening 105. The outgoing media item 1752 contacts the transport guide surface 352 and is not (or only negligibly) deformed by the biased plate elements $\mathbf{1210}_{1,2}$ which are in the further state (retracted configuration). The outgoing media item 1752 continues along the transport pathway portion 310.

Throughout the description and claims of this patent specification, the words “comprise” and “contain” and variations of them mean “including but not limited to” and they are not intended to and do not exclude other moieties, additives, components, integers or steps. Throughout the description and claims of this patent specification, the singular encompasses the plural unless the context otherwise requires. In particular where the indefinite article is used, the patent specification is to be understood as contemplating plurality as well as singularity, unless the context requires otherwise.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, any alternatives mentioned above, and all equivalents thereto.

Features, integers, characteristics or groups described in conjunction with a particular aspect, embodiment or example of the invention are to be understood to be applicable to any other aspect, embodiment or example described herein unless incompatible therewith. All of the features disclosed in this patent specification including any accompanying claims, abstract and drawings, and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this patent specification including any accompanying claims, abstract and drawings, or to any novel one, or any novel combination, of the steps of any method or process so disclosed.

What is claimed is:

1. An apparatus for storing media items at a storage zone, comprising:

a storage zone for storing media items;

a port region that is proximate to the storage zone for receiving at least one media item; and a media item deformer for deforming each media item that is transported along a transport pathway portion, the media item deformer comprising a wave contoured contact surface formed by a plurality of laterally spaced, upwardly extending ribs that collectively form an undulating support surface for engagement with each media item, each of the laterally spaced, upwardly extending ribs extending upwardly by at least 5 mm, the media item deformer being rotatable between a retracted configuration away from the transport pathway portion and a protruding configuration extending into the transport pathway portion.

2. The apparatus as claimed in claim 1, wherein the media item deformer is configured to reduce a lateral extent of the media item as the media item moves to a desired location in the storage zone.

3. The apparatus as claimed in claim 1, wherein the media item deformer is configured to move at least one short edge of the media item in a lateral direction.

4. The apparatus as claimed in claim 1, wherein the media item deformer is configured to adjust a shape of the media item into an at least partially curved shape, the at least partially curved shape having an axis of curvature substantially orthogonal to a lateral direction of the media item.

5. The apparatus as claimed in claim 4, wherein the media item deformer is configured to adjust the shape of the media item into an at least partially corrugated shape.

6. The apparatus as claimed in claim 1, wherein the media item deformer comprises at least one support surface for engagement with the media item thereby deforming a shape of the media item.

7. The apparatus as claimed in claim 1, wherein the transport pathway portion is from the port region into the storage zone.

8. The apparatus as claimed in claim 7, wherein the transport pathway portion comprises an interface region through which the media item passes from the transport pathway portion into the storage zone.

9. The apparatus as claimed in claim 8, wherein the media item deformer is located adjacent to the interface region.

10. The apparatus as claimed in claim 7, further comprising at least one set of mover elements to at least partially move the media item along the transport pathway portion.

11. The apparatus as claimed in claim 10, wherein the media item deformer is located adjacent to a final set of the mover elements before a media item moves to a desired location of the storage zone.

12. The apparatus as claimed in claim 1, wherein the media item deformer is movable between a retracted configuration and a protruding configuration.

13. The apparatus as claimed in claim 12, wherein, in the protruding configuration, the media item deformer extends towards the transport pathway portion, or wherein, in the retracted configuration, the media item deformer extends away from the transport pathway portion.

14. The apparatus as claimed in claim 1, wherein the storage zone comprises a chamber region in a storage receptacle that is a currency cassette, and wherein each media item comprises a currency note of a specified denomination whereby currency notes of a common denomination are stacked in the currency cassette.

15. The apparatus as claimed in claim 1, further comprising an actuator configured to move the media item deformer between the retracted configuration and the protruding configuration.

16. A method for receiving media items at a desired location in a storage zone, comprising:

providing at least one media item one-by-one at a port region that is proximate to a storage zone; and as each media item is transported from the port region to the desired location in the storage zone via a transport pathway portion, deforming the media item via a media item deformer thereby reducing at least a lateral extent of the media item as the media item moves to the desired location; and wherein the media item deformer comprises a wave contoured contact surface formed by a plurality of laterally spaced, upwardly extending ribs that collectively form an undulating support surface for engagement with the media item, each of the laterally spaced, upwardly extending ribs extending upwardly by at least 5 mm, and wherein the media item deformer is rotatable between a retracted configuration away from the transport pathway portion and a protruding configuration extending into the transport pathway portion.

17. The method as claimed in claim 16, further comprising deforming the media item by temporarily inducing a curved shape in a cross-section of the media item thereby drawing spaced apart edges of the media item together.

18. The method as claimed in claim 16, further comprising deforming the media item by transporting the media item over at least one undulating support surface.

19. The method as claimed in claim 16, further comprising deforming the media item by transporting the media item between opposed sets of offset roller elements.

20. The method as claimed in claim 16, further comprising reducing the lateral extent of the media item by inducing at least one curve in a cross-section of a long edge of the media item thereby locating at least one short edge of the media item nearer to a centre of the media item than when the media item is in an unloaded state.

* * * * *